(12) United States Patent
Cheng et al.

(10) Patent No.: US 10,749,754 B2
(45) Date of Patent: Aug. 18, 2020

(54) NETWORK DISTANCE PREDICTION METHOD AND APPARATUS

(71) Applicant: Huawei Technologies Co., Ltd., Shenzhen (CN)

(72) Inventors: Jie Cheng, Shenzhen (CN); Haibin Wang, Hangzhou (CN); Yanhua Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/371,909

(22) Filed: Apr. 1, 2019

(65) Prior Publication Data
US 2019/0229997 A1    Jul. 25, 2019

Related U.S. Application Data

(63) Continuation of application No. PCT/CN2016/101309, filed on Sep. 30, 2016.

(51) Int. Cl.
*H04L 12/24* (2006.01)
*H04W 64/00* (2009.01)
*H04W 4/02* (2018.01)

(52) U.S. Cl.
CPC ............ *H04L 41/12* (2013.01); *H04W 64/00* (2013.01); *H04W 64/003* (2013.01); *H04W 4/023* (2013.01)

(58) Field of Classification Search
CPC ......... H04L 41/02; H04L 41/12; H04L 40/38; H04W 5/0069
See application file for complete search history.

(56) References Cited

U.S. PATENT DOCUMENTS

| | | | | |
|---|---|---|---|---|
| 6,148,211 | A | * | 11/2000 | Reed ............ H04W 64/00 455/456.2 |
| 7,948,917 | B2 | | 5/2011 | Hilt et al. |

(Continued)

FOREIGN PATENT DOCUMENTS

| | | |
|---|---|---|
| CN | 103840985 A | 6/2014 |
| CN | 104601385 A | 5/2015 |

(Continued)

OTHER PUBLICATIONS

Machine Translation and Abstract of Chinese Publication No. CN103840985, Jun. 4, 2014, 17 pages.

(Continued)

*Primary Examiner* — Warner Wong
(74) *Attorney, Agent, or Firm* — Conley Rose, P.C.

(57) ABSTRACT

A network distance prediction method and apparatus, wherein the method includes communicating, with at least two reference nodes, to determine values of at least some elements in a local distance matrix; constructing, the local distance matrix based on the values of the at least some elements in the local distance matrix; performing, low-rank sparse factorization on the local distance matrix to obtain a low-rank matrix; obtaining, values of elements in a first element set of the low-rank matrix, to use the values as target values of network distances between the to-be-positioned node and the at least two reference nodes; communicating, with the reference nodes, to obtain coordinates of the reference nodes in a network coordinate system; and determining, coordinates of the to-be-positioned node.

20 Claims, 10 Drawing Sheets

(56) References Cited

U.S. PATENT DOCUMENTS

| | | | |
|---|---|---|---|
| 8,144,611 B2 | 3/2012 | Agarwal et al. | |
| 8,229,017 B1 | 7/2012 | Lee et al. | |
| 8,825,813 B2 | 9/2014 | Yuan et al. | |
| 9,392,533 B1* | 7/2016 | Vivanco | H04W 48/16 |
| 2009/0176507 A1* | 7/2009 | Wu | G01S 5/04 |
| | | | 455/456.2 |
| 2011/0172956 A1* | 7/2011 | Nakadai | H04L 45/02 |
| | | | 702/158 |
| 2012/0220313 A1* | 8/2012 | Li | H04W 64/00 |
| | | | 455/456.1 |
| 2013/0096922 A1* | 4/2013 | Asaei | G01S 3/8006 |
| | | | 704/270 |
| 2014/0235273 A1* | 8/2014 | Ahn | G01S 5/0236 |
| | | | 455/456.1 |
| 2016/0055692 A1* | 2/2016 | Trani | G07C 9/00571 |
| | | | 340/5.61 |
| 2016/0135178 A1* | 5/2016 | Mok | H04W 4/023 |
| | | | 455/450 |
| 2017/0182793 A1* | 6/2017 | Nishi | B41J 2/3351 |
| 2017/0238139 A1* | 8/2017 | Cui | H04W 40/20 |
| | | | 455/456.5 |
| 2017/0328979 A1* | 11/2017 | Franke | H04L 67/12 |
| 2019/0090092 A1* | 3/2019 | Hwang | H04W 4/029 |
| 2019/0246248 A1* | 8/2019 | Baroudi | H04W 84/20 |

FOREIGN PATENT DOCUMENTS

| | | | | |
|---|---|---|---|---|
| CN | 104968047 A | | 10/2015 | |
| CN | WO2017/219464 | * | 8/2016 | H04W 64/00 |

OTHER PUBLICATIONS

Machine Translation and Abstract of Chinese Publication No. CN104601385, May 6, 2015, 10 pages.

Machine Translation and Abstract of Chinese Publication No. CN104968047, Oct. 7, 2015, 11 pages.

"Telecommunications and Internet converged Services and Protocols for Advanced Networking (TISPAN); Analysis of Location Information Standards produced by various SDOs," ETSI TS 102 650, V1.1.1, Jul. 2008, 80 pages.

Chen, S., et al. "Network Distance Prediction Based on Nonnegative Matrix Factorization," Computer Engineering, With English abstract, vol. 37, No. 5, Mar. 2011, 3 pages.

Foreign Communication From a Counterpart Application, PCT Application No. PCT/CN2016/101309, English Translation of International Search Report dated Jun. 20, 2017, 2 pages.

Foreign Communication From a Counterpart Application, PCT Application No. PCT/CN2016/101309, English Translation of Written Opinion dated Jun. 20, 2017, 3 pages.

Donnet, B., et al. "A Survey on Network Coordinates Systems, Design, and Security," XP11308928, IEEE Communication Surveys and Tutorial, vol. 12, No. 4, Fourth Quarter 2010, pp. 488-503.

Cheng, J., et al. "RNC: A High-Precision Network Coordinate System," XP32653343, IEEE 22nd International Symposium of Quality of Service (IWQoS), May 2014, pp. 228-237.

Cheng, J., et al. "High-precision Shortest Distance Estimation for Large-Scale Social Networks," XP32930167, The 35th Annual IEEE International Conference on Computer Communications, Apr. 2016, 9 pages.

Liu, B., et al. "Network Latency Prediction for Personal Devices: Distance-Feature Decomposition from 3D Sampling," XP33208289, IEEE Conference on Computer Communications (INFOCOM), 2015, pp. 307-315.

Foreign Communication From a Counterpart Application, European Application No. 16917379.6, Extended European Search Report dated Jul. 22, 2019, 12 pages.

* cited by examiner

NETWORK DISTANCE PREDICTION METHOD AND APPARATUS

CROSS-REFERENCE TO RELATED APPLICATIONS

This application is a continuation of international patent application number PCT/CN2016/101309 filed on Sep. 30, 2016, which is incorporated by reference.

TECHNICAL FIELD

Embodiments of the present disclosure relate to the field of network coordinate systems, and more specifically, to a network distance prediction method and apparatus.

BACKGROUND

A network coordinate system (NCS) is a scalable network distance prediction solution. There is a plurality of manners of defining a network distance. For example, a network distance may be a network delay, network bandwidth, or another measurable physical quantity. As shown in FIG. 1, a network usually includes a plurality of nodes. In a process of constructing a network coordinate system, each node participating in the construction of the network coordinate system may obtain one or more d-dimension vectors through a small amount of measurement. The one or more d-dimension vectors are coordinates of the node in the network coordinate system. Using an example in which the network coordinate system is a network coordinate system based on a Euclidean model, after coordinates of the plurality of nodes shown in FIG. 1 in the Euclidean coordinate system are determined, the plurality of nodes shown in FIG. 1 may be converted into the Euclidean coordinate system to obtain FIG. 2. Assuming that a network distance represents a network delay between two nodes, a network delay between a node 1 and a node 2 in FIG. 1 can be obtained by calculating a distance between a node 1 and a node 2 in FIG. 2.

The network coordinate system is characterized by high scalability and low measurement overheads and can predict a network distance, for example, information such as a network delay or network bandwidth, between any two nodes, according to a pre-defined calculation rule by using network coordinates of the two nodes. Measurement complexity of a network system including M nodes is O(M), and therefore the network coordinate system can predict network distances, for example, delays or bandwidth, between M(M−1) links through measurement whose complexity is O(M), so as to avoid a large amount of end-to-end measurement. The network coordinate system may be applied to a large-scale distributed network system, and can greatly reduce measurement complexity between nodes.

In some approaches, before a network coordinate system is used, coordinates of nodes in a network system need to be first determined in the network coordinate system. In addition, because a status of the network system dynamically changes, a node in the network coordinate system also needs to update coordinates of the node in the network coordinate system continuously. Specifically, a to-be-positioned node first selects a plurality of reference nodes (for example, 32 reference nodes) and then communicates with the reference nodes, to measure network distances between the to-be-positioned node and the reference nodes, for example, delays or bandwidth between the to-be-positioned node and the reference nodes. Further, the to-be-positioned node also receives coordinates of the reference nodes in the network coordinate system. In this way, the to-be-positioned node can fit coordinates of the to-be-positioned node in the network coordinate system based on the coordinates of the reference nodes in the network coordinate system and the measured network distances.

However, due to impact of factors such as random network delay pollution (that is, a random delay change caused by random fluctuation of network communication), a machine fault, or a measurement error, a network distance measured by the to-be-positioned node usually includes an error value and an outlier value. As a result, the coordinates fitted by the to-be-positioned node are inaccurate, causing a relatively large network distance error during subsequent prediction.

SUMMARY

This application provides a network distance prediction method and apparatus, to improve accuracy of network distance prediction.

According to a first aspect, a network distance prediction method is provided, including: communicating, by a to-be-positioned node in a network coordinate system, with at least two reference nodes, to determine values of at least some elements in a local distance matrix, where an element $Q_{ij}$ in the local distance matrix is used to record an initial value of a network distance between a node corresponding to row i and a node corresponding to column j of the local distance matrix, initial values of network distances between the to-be-positioned node and the at least two reference nodes are recorded in a first element set of the local distance matrix, and i and j are integers greater than or equal to 0; constructing, by the to-be-positioned node, the local distance matrix based on the values of the at least some elements in the local distance matrix; performing, by the to-be-positioned node, low-rank sparse factorization on the local distance matrix, to obtain a low-rank matrix; obtaining, by the to-be-positioned node, values of elements in a first element set of the low-rank matrix, to use the values as target values of the network distances between the to-be-positioned node and the at least two reference nodes; communicating, by the to-be-positioned node, with the at least two reference nodes, to obtain coordinates of the at least two reference nodes in the network coordinate system; and determining, by the to-be-positioned node, coordinates of the to-be-positioned node in the network coordinate system based on the target values of the network distances between the to-be-positioned node and the at least two reference nodes and the coordinates of the at least two reference nodes in the network coordinate system, where the coordinates of the to-be-positioned node in the network coordinate system are used to predict a network distance between the to-be-positioned node and a target node, and the target node is any node in the network coordinate system except the to-be-positioned node.

In some approaches, a to-be-positioned node communicates with a reference node, to measure a network distance between the to-be-positioned node and the reference node, and then directly fits coordinates of the to-be-positioned node based on coordinates of the reference node and the measured network distance. Because an error exists in a measurement process performed by the to-be-positioned node, a measurement result may include an error value and an outlier value. As a result, the coordinates fitted by the to-be-positioned node are inaccurate, causing a relatively large network distance error during subsequent prediction.

In this embodiment of the present disclosure, the coordinates of the to-be-positioned node are not directly fitted based on the network distances obtained through communications between the to-be-positioned node and the reference nodes. Instead, the network distances obtained through communication between the to-be-positioned node and the reference nodes are used as the initial values of the network distances and recorded in the first element set of the constructed local distance matrix. The local distance matrix is a submatrix of a global distance matrix of the network coordinate system and may be regarded as an approximation of the global distance matrix, and due to impact of a relatively low dimension of coordinates in the network coordinate system, the global distance matrix is a low-rank matrix. Therefore the local distance matrix is usually also a low-rank matrix. A network coordinate system based on a matrix factorization model is used as an example. Assuming that the network coordinate system includes M nodes and a dimension of an outgoing vector or an incoming vector of each node is d, a global distance matrix is $D=U_M V_M^T$, where $U_M$ is a matrix including outgoing vectors of the M nodes, and $V_M$ is a matrix including incoming vectors of the M nodes. The matrix $U_M$ is an M×d matrix, the matrix $V_M$ is a d×M matrix, and maximum rank values of the matrix $U_M$ and the matrix $V_M$ are d (it should be noted that d is usually far less than M). Therefore, a maximum rank of D is d. For another example, using an example of a network coordinate system based on a Euclidean model, assuming that coordinates in the network coordinate system based on the Euclidean distance are d-dimension vectors, a maximum rank value of a global distance matrix is d+2. However, due to impact of an error value and an outlier value, a rank of the local distance matrix is usually relatively high. Therefore, in this embodiment of the present disclosure, low-rank sparse factorization is performed on the local distance matrix, and the obtained low-rank matrix is equivalent to a relatively accurate local distance matrix obtained by removing the error value and the outlier value from the local distance matrix. Therefore, a network distance (that is, a target value of the network distance) between the to-be-positioned node and a reference node in the first element set of the low-rank matrix is more accurate than the network distances (that is, the initial values of the network distances) between the to-be-positioned node and the reference nodes that are recorded in the first element set of the local distance matrix, and the fitted coordinates of the to-be-positioned node in the network coordinate system are more accurate, thereby improving accuracy of subsequent network distance prediction.

With reference to the first aspect, in some implementations of the first aspect, each element in the low-rank matrix is greater than or equal to 0. For example, low-rank sparse factorization may be performed on the local distance matrix according to a constraint condition that each element in the low-rank matrix is greater than or equal to 0. An element in the low-rank matrix is used to record a network distance in the network coordinate system, the network distance represents a measurable physical quantity such as a network delay or network bandwidth, and these physical quantities are all non-negative. In this embodiment of the present disclosure, low-rank sparse factorization is performed on the local distance matrix according to the constraint condition that each element in the low-rank matrix is greater than or equal to 0. This ensures that each element in the low-rank matrix is a non-negative element. To be specific, this ensures that the network distance is non-negative, thereby improving accuracy of the determined coordinates of the to-be-positioned node, and further improving accuracy of subsequent network distance prediction.

With reference to the first aspect, in some implementations of the first aspect, the local distance matrix is equal to a sum of the low-rank matrix, a sparse matrix, and a target matrix, and values of the at least some elements (for ease of description, the at least some elements are referred to as target elements below) in the target matrix are 0.

Specifically, the performing, by the to-be-positioned node, low-rank sparse factorization on the local distance matrix may include: performing, by the to-be-positioned node, low-rank sparse factorization on the local distance matrix according to a constraint condition that the local distance matrix is equal to the sum of the low-rank matrix, the sparse matrix, and the target matrix, and a target element in the target matrix is equal to 0.

First, it should be noted that an element in the local distance matrix is used to record a network distance between two nodes, and the network distance between nodes that is recorded in the local distance matrix may be obtained based on communication between the to-be-positioned node and the reference nodes. For example, the to-be-positioned node may measure the network distances between the to-be-positioned node and the reference nodes. Further, the to-be-positioned node may obtain the coordinates of the reference nodes in the network coordinate system and determine network distances between the reference nodes based on the coordinates of the reference nodes in the network coordinate system. However, a process of communication between the to-be-positioned node and the reference nodes is unstable. This may cause a loss of some information (such as a network distance measurement failure or a failure to obtain the coordinates of the reference nodes). If the information is lost, values of some elements in the local distance matrix cannot be determined. To resolve an information loss problem, a variable, that is, the target matrix, is introduced in this embodiment of the present disclosure. Network distances between two nodes corresponding to the at least some elements (that is, target elements) in the local distance matrix are known. This means that the information loss problem does not exist for these network distances. Therefore, in this embodiment of the present disclosure, the target elements in the target matrix are set to 0. Assuming that a network distance between two nodes corresponding to an element in the local distance matrix is unknown, an initial value may be assigned to the element. The initial value may be set to 0 or any other value. Due to existence of the target matrix, low-rank sparse factorization can still be performed on the local distance matrix in which some information is lost, improving robustness of an algorithm.

With reference to the first aspect, in some implementations of the first aspect, the performing, by the to-be-positioned node, low-rank sparse factorization on the local distance matrix, to obtain a low-rank matrix includes: performing, by the to-be-positioned node, low-rank sparse factorization on the local distance matrix based on the following optimal model, to obtain the low-rank matrix:

$$\min_{A,E,B,G} (\|A\|_* + \lambda \|E\|_1)$$

$$\text{s.t.: } Q = A + E + G$$

$$A = B$$

$$B \geq 0$$

$$\pi(G) = 0,$$

where Q represents the local distance matrix, A represents the low-rank matrix, E represents the sparse matrix, G represents the target matrix, $\pi(G)=0$ represents that the values of the at least some elements in the target matrix are 0, $B \geq 0$ represents that a value of each element in a matrix B is greater than or equal to 0, $\|A\|_*$ represents a nuclear norm of the matrix A, $\|E\|_1$ represents an L1 norm of the matrix E, $\lambda$ is a weight, and $\lambda$ is greater than 0.

With reference to the first aspect, in some implementations of the first aspect, the network coordinate system is a network coordinate system based on a matrix factorization model.

With reference to the first aspect, in some implementations of the first aspect, the network coordinate system is a network coordinate system based on a Euclidean model.

With reference to the first aspect, in some implementations of the first aspect, the local distance matrix further includes a second element set, elements in the second element set of the local distance matrix are used to record initial values of network distances between the at least two reference nodes, and the determining values of at least some elements in a local distance matrix includes: measuring, by the to-be-positioned node, the initial values of the network distances between the to-be-positioned node and the at least two reference nodes, to use the initial values as values of elements in the first element set of the local distance matrix; and determining, by the to-be-positioned node, based on the coordinates of the at least two reference nodes in the network coordinate system, the initial values of the network distances between the at least two reference nodes as values of the elements in the second element set of the local distance matrix.

With reference to the first aspect, in some implementations of the first aspect, the network coordinate system is the network coordinate system based on the matrix factorization model, a rank of the low-rank matrix is less than or equal to d, and d represents a dimension of coordinates in the network coordinate system.

Assuming that the network coordinate system includes M nodes and a dimension of an outgoing vector or an incoming vector of each node is d, a global distance matrix is $D=U_M V_M^T$, where $U_M$ is a matrix including outgoing vectors of the M nodes, and $V_M$ is a matrix including incoming vectors of the M nodes. The matrix $U_M$ is an M×d matrix, the matrix $V_M$ is a d×M matrix, and maximum rank values of the matrix $U_M$ and the matrix $V_M$ are d. Therefore, a maximum rank of D is d (it should be noted that d is usually far less than M). In this embodiment of the present disclosure, the local distance matrix is used to simulate the global distance matrix, and therefore the rank of the local distance matrix should be less than or equal to d. However, due to impact of an error value and an outlier value, the rank of the local distance matrix is usually quite high, and the error value and the outlier value need to be removed from the local distance matrix, to obtain the low-rank matrix. In this embodiment of the present disclosure, a constraint condition that the rank of the low-rank matrix is less than or equal to d is used, so that the solved low-rank matrix is in line with an actual situation better.

With reference to the first aspect, in some implementations of the first aspect, the network coordinate system is the network coordinate system based on the matrix factorization model; the target values of the network distances between the to-be-positioned node and the at least two reference nodes include target values of incoming distances between the to-be-positioned node and the at least two reference nodes and target values of outgoing distances between the to-be-positioned node and the at least two reference nodes, the incoming distances are used to indicate network distances from the at least two reference nodes to the to-be-positioned node, and the outgoing distances are used to indicate network distances from the to-be-positioned node to the at least two reference nodes; and the determining, by the to-be-positioned node, coordinates of the to-be-positioned node in the network coordinate system based on the target values of the network distances between the to-be-positioned node and the at least two reference nodes and the coordinates of the at least two reference nodes in the network coordinate system includes: determining, by the to-be-positioned node, the coordinates of the to-be-positioned node in the network coordinate system according to the following formulas:

$$\min_X \|A_{in} - Y U_{out}^T\|_F^2, \text{ s.t. } Y \geq 0, \text{ and}$$

$$\min_X \|A_{out} - X V_{in}^T\|_F^2, \text{ s.t. } X \geq 0,$$

where $A_{in}$ represents the target values of the incoming distances between the to-be-positioned node and the at least two reference nodes, $A_{out}$ represents the target values of the outgoing distances between the to-be-positioned node and the at least two reference nodes, X represents a coordinate of the to-be-positioned node used to calculate the outgoing distances, Y represents a coordinate of the to-be-positioned node used to calculate the incoming distances, $U_{out}$ represents a vector including coordinates, used to calculate the incoming distances, of the at least two reference nodes, and $V_{in}$ represents a vector including coordinates, used to calculate the outgoing distances, of the at least two reference nodes. Alternatively, X may represent an outgoing vector of the to-be-positioned node, Y may represent an incoming vector of the to-be-positioned node, $U_{out}$ may represent a vector matrix including outgoing vectors of the at least two reference nodes, and $V_{in}$ may represent a vector matrix including incoming vectors of the at least two reference nodes.

With reference to the first aspect, in some implementations of the first aspect, the method further includes: sending, by the to-be-positioned node, request information to the target node in the network coordinate system, where the request information is used to request coordinates of the target node in the network coordinate system; and predicting, by the to-be-positioned node, the network distance between the to-be-positioned node and the target node based on the coordinates of the to-be-positioned node in the network coordinate system and the coordinates of the target node in the network coordinate system.

With reference to the first aspect, in some implementations of the first aspect, a network distance between two nodes in the network coordinate system is used to evaluate quality of a network between the two nodes. Alternatively, a network distance between two nodes in the network coordinate system may be a parameter used to evaluate quality or a network property of a network between the two nodes.

With reference to the first aspect, in some implementations of the first aspect, a network distance between two nodes in the network coordinate system is used to indicate a network delay and/or network bandwidth between the two nodes.

According to a second aspect, a network distance prediction apparatus is provided, where the apparatus is a to-be-positioned node in a network coordinate system, and the apparatus includes: a first determining unit configured to communicate with at least two reference nodes, to determine values of at least some elements in a local distance matrix, where an element $Q_{ij}$ in the local distance matrix is used to record an initial value of a network distance between a node corresponding to row i and a node corresponding to column j of the local distance matrix, initial values of network distances between the to-be-positioned node and the at least two reference nodes are recorded in a first element set of the local distance matrix, and i and j are integers greater than or equal to 0; a constructing unit configured to construct the local distance matrix based on the values of the at least some elements in the local distance matrix; a factorization unit configured to perform low-rank sparse factorization on the local distance matrix, to obtain a low-rank matrix; a first obtaining unit configured to: obtain values of elements in a first element set of the low-rank matrix, to use the values as target values of the network distances between the to-be-positioned node and the at least two reference nodes; a second obtaining unit configured to communicate with the at least two reference nodes, to obtain coordinates of the at least two reference nodes in the network coordinate system; and a second determining unit configured to determine coordinates of the to-be-positioned node in the network coordinate system based on the target values of the network distances between the to-be-positioned node and the at least two reference nodes and the coordinates of the at least two reference nodes in the network coordinate system, where the coordinates of the to-be-positioned node in the network coordinate system are used to predict a network distance between the to-be-positioned node and a target node, and the target node is any node in the network coordinate system except the to-be-positioned node.

With reference to the second aspect, in some implementations of the second aspect, each element in the low-rank matrix is greater than or equal to 0.

With reference to the second aspect, in some implementations of the second aspect, the local distance matrix is equal to a sum of the low-rank matrix, a sparse matrix, and a target matrix, and values of the at least some elements in the target matrix are 0.

With reference to the second aspect, in some implementations of the second aspect, the factorization unit is further configured to perform low-rank sparse factorization on the local distance matrix based on the following optimal model, to obtain the low-rank matrix:

$$\min_{A,E,B,G}(\|A\|_* + \lambda\|E\|_1)$$
$$\text{s.t.:} \quad Q = A + E + G$$
$$A = B$$
$$B \geq 0$$
$$\pi(G) = 0$$

where Q represents the local distance matrix, A represents the low-rank matrix, E represents the sparse matrix, G represents the target matrix, $\pi(G)=0$ represents that the values of the at least some elements in the target matrix are 0, $B \geq 0$ represents that a value of each element in a matrix B is greater than or equal to 0, $\|A\|_*$ represents a nuclear norm of the matrix A, $\|E\|_1$ represents an L1 norm of the matrix E, $\lambda$ is a weight, and $\lambda$ is greater than 0.

With reference to the second aspect, in some implementations of the second aspect, the local distance matrix further includes a second element set, elements in the second element set of the local distance matrix are used to record initial values of network distances between the at least two reference nodes, and the first determining unit is further configured to: measure the initial values of the network distances between the to-be-positioned node and the at least two reference nodes, to use the initial values as values of elements in the first element set of the local distance matrix; and determine, based on the coordinates of the at least two reference nodes in the network coordinate system, the initial values of the network distances between the at least two reference nodes as values of the elements in the second element set of the local distance matrix.

With reference to the second aspect, in some implementations of the second aspect, the network coordinate system is a network coordinate system based on a matrix factorization model, a rank of the low-rank matrix is less than or equal to d, and d represents a dimension of coordinates in the network coordinate system.

With reference to the second aspect, in some implementations of the second aspect, the network coordinate system is the network coordinate system based on the matrix factorization model; the target values of the network distances between the to-be-positioned node and the at least two reference nodes include target values of incoming distances between the to-be-positioned node and the at least two reference nodes and target values of outgoing distances between the to-be-positioned node and the at least two reference nodes, the incoming distances are used to indicate network distances from the at least two reference nodes to the to-be-positioned node, and the outgoing distances are used to indicate network distances from the to-be-positioned node to the at least two reference nodes; and the second determining unit is further configured to determine the coordinates of the to-be-positioned node in the network coordinate system according to the following formulas:

$$\min_X \|A_{in} - YU_{out}^T\|_F^2, \text{ s.t. } Y \geq 0, \text{ and}$$
$$\min_X \|A_{out} - XV_{in}^T\|_F^2, \text{ s.t. } X \geq 0,$$

where $A_{in}$ represents the target values of the incoming distances between the to-be-positioned node and the at least two reference nodes, $A_{out}$ represents the target values of the outgoing distances between the to-be-positioned node and the at least two reference nodes, X represents a coordinate of the to-be-positioned node used to calculate the outgoing distances, Y represents a coordinate of the to-be-positioned node used to calculate the incoming distances, $U_{out}$ represents a vector including coordinates, used to calculate the incoming distances, of the at least two reference nodes, and $V_{in}$ represents a vector including coordinates, used to calculate the outgoing distances, of the at least two reference nodes.

With reference to the second aspect, in some implementations of the second aspect, the apparatus further includes: a sending unit configured to send request information to the target node in the network coordinate system, where the request information is used to request coordinates of the target node in the network coordinate system; and a predicting unit configured to predict the network distance between the to-be-positioned node and the target node based on the coordinates of the to-be-positioned node in the network coordinate system and the coordinates of the target node in the network coordinate system.

With reference to the second aspect, in some implementations of the second aspect, a network distance between two nodes in the network coordinate system is used to evaluate quality of a network between the two nodes.

According to a third aspect, a node is provided, including a memory, a transceiver, and a processor, where the memory is configured to store a program, the processor is configured to execute the program, and when the program is executed, the processor performs the method in the first aspect based on the transceiver.

According to a fourth aspect, a computer readable medium is provided, where the computer readable medium stores program code to be executed by a node, and the program code includes an instruction used to perform the method in the first aspect.

BRIEF DESCRIPTION OF DRAWINGS

The following briefly describes the accompanying drawings of embodiments of the present disclosure.

DESCRIPTION OF EMBODIMENTS

The following describes the technical solutions in the embodiments of the present disclosure with reference to the accompanying drawings in the embodiments of the present disclosure.

Figure 1:
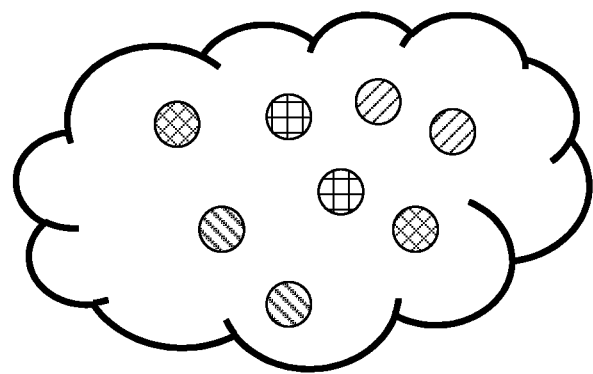
FIG. 1 is a schematic diagram of a network coordinate system.
Figure 2:
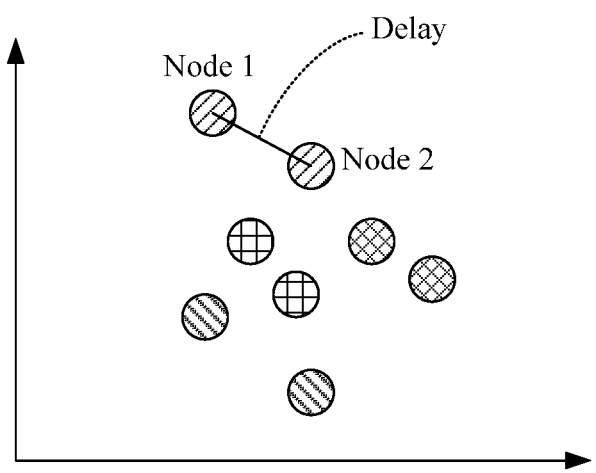
FIG. 2 is a schematic diagram of a network distance between nodes in FIG. 1 in a Euclidean coordinate system.
Figure 3:
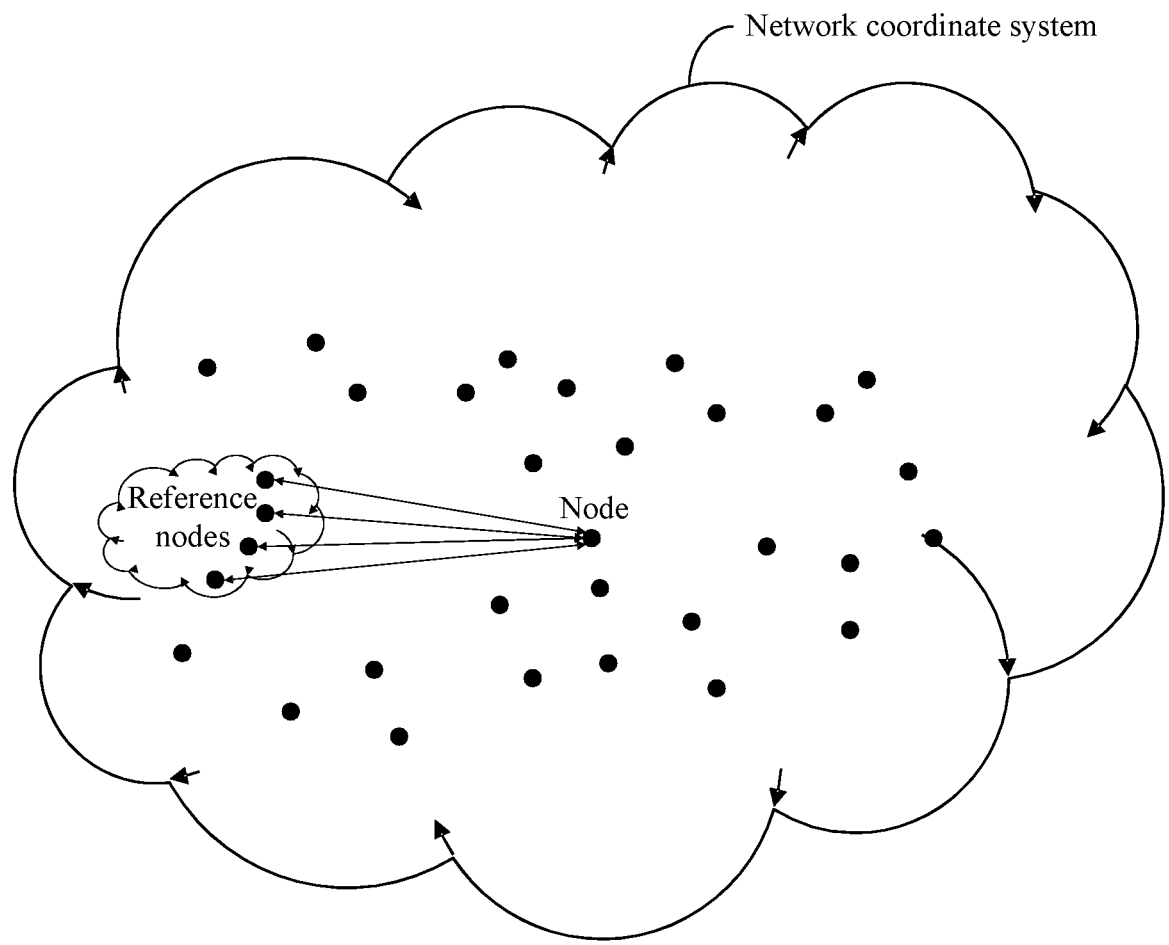
FIG. 3 is a diagram of an example of an application scenario according to an embodiment of the present disclosure.
Figure 4:
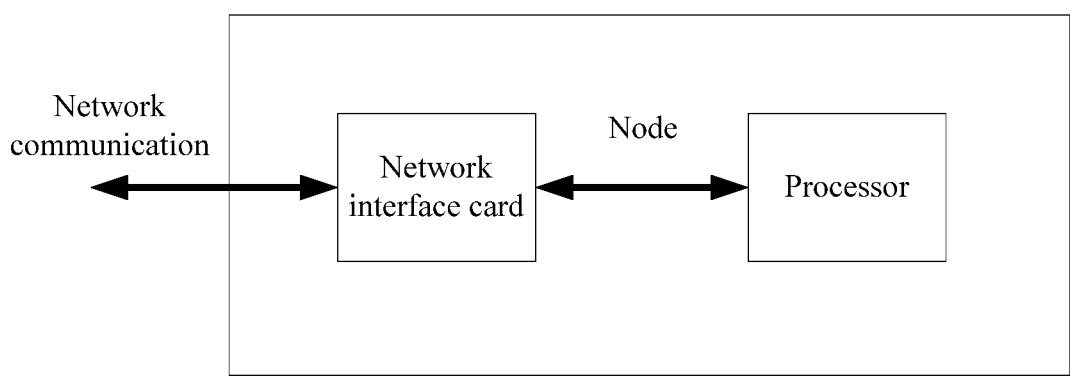
FIG. 4 is a schematic structural diagram of a node in a network coordinate system.

For ease of understanding, an example of an application scenario in an embodiment of the present disclosure is briefly described with reference to FIG. 3. As shown in FIG. 3, a network coordinate system includes many nodes, and each node may be an independent network device, for example, a host, a router, a domain name system (DNS) server, a content delivery network (CDN) server. FIG. 4 is a schematic structural diagram of a node in a network coordinate system. Referring to FIG. 4, the node may include a network interface card and a processor. The network interface card may be configured to communicate and exchange data with another node in the network coordinate system, for example, measure a network distance between the node and a reference node, or receive coordinates sent by the reference node. The processor of the node may calculate or update coordinates of the node in the network coordinate system based on information obtained through communication.

In the network coordinate system, each node has coordinates, and an initial situation, the coordinates of each node may be randomly generated. Nodes in the network coordinate system may be connected to and communicate with each other by using a communications network. To learn or update coordinates of a to-be-positioned node in the network coordinate system, the to-be-positioned node may select some reference nodes from the network coordinate system (as shown in FIG. 3) and communicate with these reference nodes, to measure network distances between the to-be-positioned node and the reference nodes, for example, network delays or network bandwidth between the to-be-positioned node and the reference nodes. Assuming that K reference nodes and there are M nodes in the network coordinate system, K is usually far less than M, so as to reduce end-to-end measurement between nodes. In some embodiments, a quantity of the reference nodes may be a preset parameter. Further, in some embodiments, the parameter may be kept consistent in the nodes in the network coordinate system.

For ease of understanding, before a network distance prediction method is described in detail in an embodiment of the present disclosure, meanings of a network coordinate system and some terms related to the network coordinate system are described.

The network coordinate system, also referred to as an Internet coordinate system, is a scalable Internet distance prediction solution. For a network including M nodes, each node participating in the network coordinate system obtains one (or more) d-dimension vector (or vectors) through a small amount of measurement, to be specific, coordinates of the node in the network coordinate system. A network distance between any two nodes can be predicted according to a predefined calculation rule by using coordinates of the two nodes in the network coordinate system. Measurement complexity of a network coordinate system including M nodes is O(N), and therefore the network coordinate system can predict network distances between N(N−1) links through measurement whose complexity is O(N), so as to avoid a large amount of end-to-end measurement. This is a highly scalable solution that can be applied to a large-scale distributed network system or grid computation.

There are various types of network coordinate systems. For example, the network coordinate system may be a network coordinate system based on a Euclidean model (EM). For another example, the network coordinate system may be a network coordinate system based on a matrix factorization model (MFM), for example, a Phoenix network coordinate system.

In a network coordinate system based on matrix factorization model, each node has a coordinate X and a coordinate Y, where X may also be referred to as an outgoing vector used to calculate a network distance from the node to another node (to be specific, an outgoing distance between the to-be-positioned node and the another node), and Y may also be referred to as an incoming vector used to calculate a network distance from the another node to the node (to be specific, an incoming distance between the to-be-positioned node and the another node).

Global distance matrix: The global distance matrix may include network distances between every two nodes in the network coordinate system. Assuming that the network coordinate system includes M nodes, the global distance matrix may be an M×M matrix (that is, a two-dimensional array), and an element in row i and an element in column j of the global distance matrix may represent a network distance between a node corresponding to row i and a node corresponding to column j in the M nodes.

Local distance matrix: The local distance matrix may be an approximation of the global distance matrix, and may include some elements in the global distance matrix. More elements in the local distance matrix indicate that the local distance matrix is more approximate to the global distance matrix.

To-be-positioned node: The to-be-positioned node may be any node in the network coordinate system. For example, when a new node joins the network coordinate system, the node needs to determine coordinates of the node in the network coordinate system. In this case, the node is the to-be-positioned node. For another example, a node in the network coordinate system may need to continuously maintain and update coordinates of the node in the network coordinate system. When a node maintains and updates coordinates of the node in the network coordinate system, the node is the to-be-positioned node.

Reference node: The reference nodes may be nodes selected by the to-be-positioned node to perform network distance measurement to determine the coordinates of the to-be-positioned node in the network coordinate system. To be specific, the to-be-positioned node needs to determine the coordinates of the to-be-positioned node in the network coordinate system based on measured network distances between the to-be-positioned node and the reference nodes. The reference nodes may be randomly selected by the to-be-positioned node, or may be some anchor nodes in the network coordinate system.

Network distance: A network distance between two nodes in the network coordinate system may be used to evaluate quality of a network between the two nodes. Alternatively, in other words, a network distance between two nodes in the network coordinate system may be a parameter used to evaluate quality or a network property of a network between the two nodes, for example, a network delay and/or network bandwidth between the two nodes.

Rank: In linear algebra, a column rank of a matrix A is a maximum quantity of linearly independent columns of A. Similarly, a row rank is a maximum quantity of linearly independent rows of A. A column rank and a row rank of a matrix may always be equal, and therefore the column rank and the row rank may be briefly referred to as a rank of the matrix A that is usually is expressed as r(A), rk(A), or rank A.

Low-rank sparse factorization: Low-rank sparse factorization may also be referred to as robust principal component analysis (RPCA). In a many practical applications, a given data matrix (for example, the local distance matrix in the embodiments of the present disclosure) is usually low-rank or approximately low-rank. However, due to existence of sparsely-distributed errors, a low-rank nature of the data matrix is destroyed. To restore a low-rank structure of the data matrix, the data matrix may be broken down into a sum of two matrices: a low-rank matrix A and a sparse matrix E. Both the matrix A and the matrix E are variables, but the matrix A is low-rank. There are a large number of low-rank sparse factorization manners. Usually, an optimal method, such as an augmented Lagrange multiplier (ALM) algorithm, an alternating direction method of multipliers (ADMM) algorithm, or an iterative thresholding algorithm, is used to perform solving during low-rank sparse factorization.

Sparse matrix: In numerical analysis, a sparse matrix is a matrix whose most elements are zero. On the contrary, if the most elements are not zero, the matrix is dense.

Figure 5A:
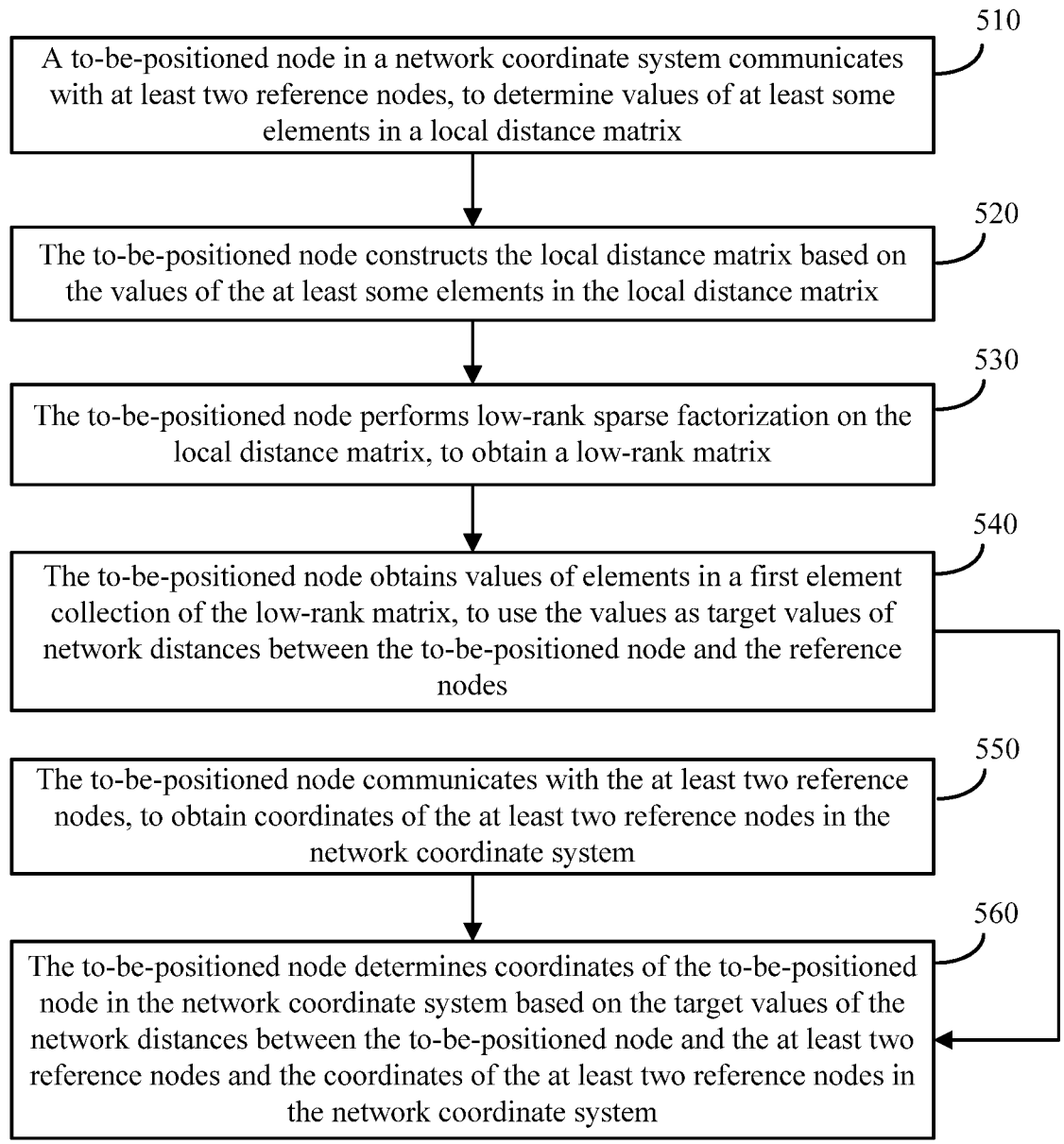
FIG. 5A is a schematic flowchart of a network distance prediction method according to an embodiment of the present disclosure.

The following describes a schematic flowchart of a network distance prediction method in an embodiment of the present disclosure in detail with reference to FIG. 5A.

FIG. 5A is a schematic flowchart of a network distance prediction method according to an embodiment of the present disclosure. The method in FIG. 5A includes the following steps.

510. A to-be-positioned node in a network coordinate system communicates with at least two reference nodes, to determine values of at least some elements in a local distance matrix, where an element $Q_{ij}$ in the local distance matrix is used to record an initial value of a network distance between a node corresponding to row i and a node corresponding to column j of the local distance matrix, initial values of network distances between the to-be-positioned node and the at least two reference nodes are recorded in a first element set of the local distance matrix, and i and j are integers greater than or equal to 0.

Specifically, the initial values of the network distances between the to-be-positioned node and the reference nodes may be obtained by the to-be-positioned node through measurement. For example, the to-be-positioned node communicates with the reference nodes, to measure the network distances between the to-be-positioned node and the reference nodes, such as network delays or network bandwidth.

Elements in a global distance matrix of the network coordinate system are used to record network distances between every two nodes in the network coordinate system. In this embodiment of the present disclosure, the local distance matrix is a submatrix of the global distance matrix and may be regarded as an approximation of the global distance matrix. However, a specific form of the local distance matrix is not limited in this embodiment of the present disclosure.

In some embodiments, the local distance matrix may be a square matrix. For example, the local distance matrix may be used to record network distances between every two of N nodes in the network coordinate system. In this case, $0 \leq i, j < N$, and N is an integer greater than 1.

For another example, the local distance matrix may be used to record network distances between $P_1$ nodes and $P_2$ nodes in the network coordinate system. In this case, a row in the local distance matrix may correspond to a node in the $P_1$ nodes, a column in the local distance matrix may correspond to a node in the $P_2$ nodes, $0 \leq i < P_1$, $0 \leq j < P_2$, both $P_1$ and $P_2$ are integers greater than 1, and $P_1 \neq P_2$.

For another example, a column in the local distance matrix may correspond to a reference node (a reference node that may communicate with the to-be-positioned node and is also referred to as a one-hop reference node) of the to-be-positioned node, and a row in the local distance matrix may correspond to a reference node (which may be referred to as a two-hop reference node of the to-be-positioned node) of a one-hop reference node of the to-be-positioned node.

Actually, network distances between which nodes corresponding to other elements in the local distance matrix are not specifically limited in this embodiment of the present disclosure, as long as the local distance matrix includes elements corresponding to the network distances between the to-be-positioned node and the reference nodes. Further, more elements in the local distance matrix indicate that the local distance matrix is more approximate to the global distance matrix. However, to construct the local distance matrix, an amount of communication between the to-be-positioned node and the reference nodes also increases correspondingly. Therefore, a balance may be made between an approximation between the local distance matrix and the global distance matrix and an amount of communication required for obtaining the local distance matrix. For example, assuming that the to-be-positioned node has K reference nodes, the local distance matrix may include network distances between every two of K+1 nodes, and the K+1 nodes include the to-be-positioned node and the K reference nodes. For another example, assuming that the to-be-positioned node has K reference nodes, the local distance matrix may include network distances between every two of K+1+T nodes, where the T nodes are reference nodes of the K reference nodes. In this case, the K reference nodes may be referred to as one-hop reference nodes of the to-be-positioned node, and the T nodes are referred to as two-hop reference nodes of the to-be-positioned node.

Further, the to-be-positioned node may measure the network distances between the to-be-positioned node and the reference nodes, use measurement results as the initial values of the network distances between the to-be-positioned node and the reference nodes, and record the initial values in elements of the first element set. In this embodiment of the present disclosure, a manner of obtaining network distances corresponding to other elements in the local distance matrix except the first element set is not specifically limited. For example, the to-be-positioned node may obtain coordinates of two nodes in the network coordinate system, determine a network distance between the two nodes based on the coordinates of the two nodes in the network coordinate system, use the network distance between the two nodes as an initial value of the network distance between the two nodes, and record the initial value in the local distance matrix. For another example, the to-be-positioned node may obtain, from a reference node, a network distance between the reference node and another node that is measured by the reference node, use the network distance as an initial value of the network distance between the reference node and the another node, and record the initial value in the local distance matrix.

Figure 5B:
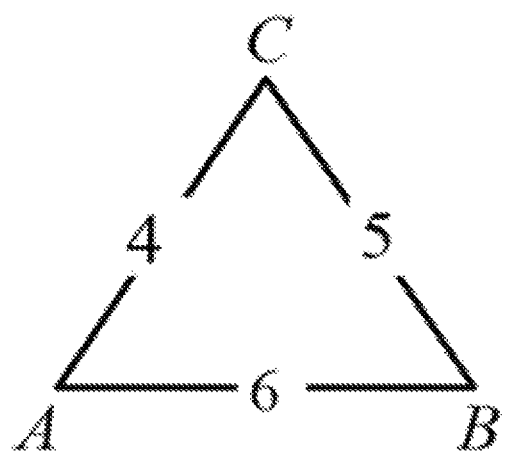
FIG. 5B shows an example of network distances between nodes in a network coordinate system based on a Euclidean model.

It is assumed that the network coordinate system is a network coordinate system based on a Euclidean model. In an example in which elements in the local distance matrix are used to record network distances between three nodes A, B, and C in the network coordinate system, assuming that a relationship between the network distances between the three nodes A, B, and C is shown in FIG. 5B, the local distance matrix is $$\begin{bmatrix} 0 & 6 & 4 \\ 6 & 0 & 5 \\ 4 & 5 & 0 \end{bmatrix}.$$

Figure 5C:
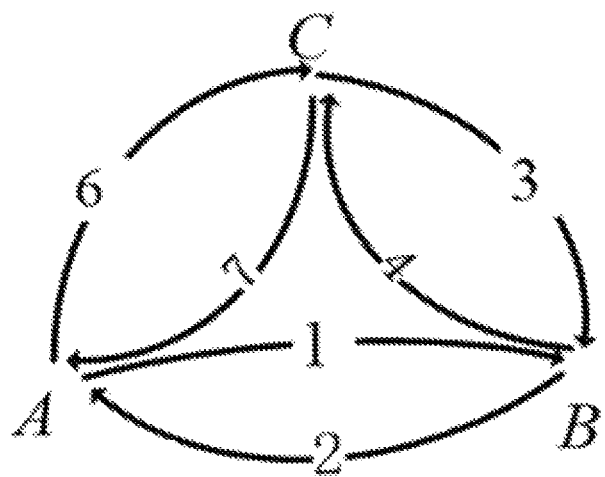
FIG. 5C shows an example of network distances between nodes in a network coordinate system based on a matrix factorization model.

It is assumed that the network coordinate system is a network coordinate system based on a matrix factorization model. In an example in which elements in the local distance matrix are used to record distances between three nodes A, B, and C in the network coordinate system, assuming that a relationship between the network distances between the three nodes A, B, and C is shown in FIG. 5C, the local distance matrix is $$\begin{bmatrix} 0 & 1 & 6 \\ 2 & 0 & 4 \\ 7 & 3 & 0 \end{bmatrix}.$$

520. The to-be-positioned node constructs the local distance matrix based on the values of the at least some elements in the local distance matrix.

530. The to-be-positioned node performs low-rank sparse factorization on the local distance matrix, to obtain a low-rank matrix.

540. The to-be-positioned node obtains values of elements in a first element set of the low-rank matrix, to use the values as target values of the network distances between the to-be-positioned node and the reference nodes.

550. The to-be-positioned node communicates with the at least two reference nodes, to obtain coordinates of the at least two reference nodes in the network coordinate system.

560. The to-be-positioned node determines coordinates of the to-be-positioned node in the network coordinate system based on the target values of the network distances between the to-be-positioned node and the at least two reference nodes and the coordinates of the at least two reference nodes in the network coordinate system, where the coordinates of the to-be-positioned node in the network coordinate system are used to predict a network distance between the to-be-positioned node and a target node, and the target node is any node in the network coordinate system except the to-be-positioned node.

Further, in some embodiments, the method in FIG. 5A may further include: sending, by the to-be-positioned node, request information to the target node, where the request information is used to request coordinates of the target node in the network coordinate system; and predicting, by the to-be-positioned node, the network distance between the to-be-positioned node and the target node based on the coordinates of the to-be-positioned node in the network coordinate system and the coordinates of the target node in the network coordinate system.

In some approaches, a to-be-positioned node communicates with a reference node, to measure a network distance between the to-be-positioned node and the reference node, and then directly fits coordinates of the to-be-positioned node based on coordinates of the reference node and the measured network distance. Because an error exists in a measurement process performed by the to-be-positioned node, a measurement result may include an error value and an outlier value. As a result, the coordinates fitted by the to-be-positioned node are inaccurate, causing a relatively large network distance error during subsequent prediction.

In this embodiment of the present disclosure, the coordinates of the to-be-positioned node are not directly fitted based on the network distances obtained through communications between the to-be-positioned node and the reference nodes. Instead, the network distances obtained through communication between the to-be-positioned node and the reference nodes are used as the initial values of the network distances and recorded in the first element set of the constructed local distance matrix. The local distance matrix is a submatrix of the global distance matrix of the network coordinate system and may be regarded as an approximation of the global distance matrix, and due to impact of a relatively low dimension of coordinates in the network coordinate system, the global distance matrix is a low-rank matrix. Therefore the local distance matrix is usually also a low-rank matrix.

Using the network coordinate system based on a matrix factorization model as an example, assuming that the network coordinate system includes M nodes and a dimension of an outgoing vector or an incoming vector of each node is d, a global distance matrix is $D=U_M V_M^T$, where $U_M$ is a matrix including outgoing vectors of the M nodes, and $V_M$ is a matrix including incoming vectors of the M nodes. The matrix $U_M$ is an M×d matrix, the matrix $V_M$ is a d×M matrix, and maximum rank values of the matrix $U_M$ and the matrix $V_M$ are d (it should be noted that d is usually far less than M). Therefore, a maximum rank of D is d. For another example, using a network coordinate system based on a Euclidean distance as an example, assuming that coordinates in the network coordinate system based on the Euclidean distance are d-dimension vectors, a maximum rank value of a global distance matrix is d+2. However, due to impact of an error value and an outlier value, a rank of the local distance matrix is usually relatively high. Therefore, in this embodiment of the present disclosure, low-rank sparse factorization is performed on the local distance matrix, and the obtained low-rank matrix is equivalent to a relatively accurate local distance matrix obtained by removing the error value and the outlier value from the local distance matrix. Further, a network distance (that is, a target value of the network distance) between the to-be-positioned node and a reference node in the first element set of the low-rank matrix is more accurate than the network distances (that is, the initial values of the network distances) between the to-be-positioned node and the reference nodes that are recorded in the first element set of the local distance matrix, and the fitted coordinates of the to-be-positioned node in the network coordinate system are more accurate, thereby improving accuracy of subsequent network distance prediction.

It should be understood that a type of the network coordinate system is not specifically limited in this embodiment of the present disclosure. Optionally, in some embodiments, the network coordinate system may be the network coordinate system based on the matrix factorization model, for example, a Phoenix network coordinate system. Optionally, in some other embodiments, the network coordinate system may be the network coordinate system based on the Euclidean model. The network coordinate system based on a matrix factorization model and the network coordinate system based on the Euclidean model are two types of network coordinate systems that are used widely currently. The following describes the two types of network coordinate systems in detail.

In the network coordinate system based on the Euclidean model, coordinates of each node may be expressed by a vector. Because a Euclidean distance is non-negative, a network distance predicted by the network coordinate system based on the Euclidean model is non-negative. The network distance usually corresponds to one to-be-measured physical quantity, such as a network delay or bandwidth. The physical quantity is non-negative. From this perspective, the network distance predicted by the network coordinate system based on the Euclidean model is in line with an actual case. In the network coordinate system based on the matrix factorization model, each node includes two coordinates X and Y. Each coordinate is a vector. The coordinate X may be referred to as an outgoing vector, and the coordinate Y may be referred to as an incoming vector. Assuming that coordinates of a node i are $(X_i, Y_i)$ and coordinates of a node j are $(X_j, Y_j)$, a distance between the node i and the node j includes an outgoing distance and an incoming distance. The outgoing distance D(i,j) is a distance from the node i to the node j, and $D(i,j)=X_i Y_j^T$. The incoming distance D(j,i) is a distance from the node j to the node i, and $D(j,i)=X_j Y_i^T$. In the network coordinate system based on the matrix factorization model, the outgoing distance and the incoming distance are introduced, and a distance between nodes is asymmetrical. This is in line with an actual case better. In an example in which the network distance represents a network delay, a delay from a node 1 to a node 2 may not be equal to a delay from the node 2 to the node 1 due to impact of a factor such as a routing policy.

It should be noted that, an implementation of step 560, to be specific, a manner of determining the coordinates of the to-be-positioned node, is related to the type of the network coordinate system. This is not specifically limited in this embodiment of the present disclosure. In an example in which the network coordinate system is the network coordinate system based on the Euclidean distance, an equation may be directly established and solved by using the coordinates of the to-be-positioned node in the network coordinate system as variables and by using the coordinates of the reference nodes in the network coordinate system and the target values of the network distances between the to-be-positioned node and the reference nodes as known values.

In an example in which the network coordinate system is the network coordinate system based on the matrix factorization model, the target values of the network distances between the to-be-positioned node and the at least two reference nodes include target values of incoming distances between the to-be-positioned node and the at least two reference nodes and target values of outgoing distances between the to-be-positioned node and the at least two reference nodes. The incoming distances are used to indicate network distances from the at least two reference nodes to the to-be-positioned node, and the outgoing distances are used to indicate network distances from the to-be-positioned node to the at least two reference nodes. The determining, by the to-be-positioned node, coordinates of the to-be-positioned node in the network coordinate system based on the target values of the network distances between the to-be-positioned node and the at least two reference nodes and the coordinates of the at least two reference nodes in the network coordinate system includes: determining, by the to-be-positioned node, the coordinates of the to-be-positioned node in the network coordinate system according to the following formulas:

$$\min_X \|A_{in} - YU_{out}^T\|_F^2, \text{ s.t. } Y \geq 0, \text{ and}$$

$$\min_X \|A_{out} - XV_{in}^T\|_F^2, \text{ s.t. } X \geq 0,$$

where $A_{in}$ represents the target values of the incoming distances between the to-be-positioned node and the at least two reference nodes, $A_{out}$ represents the target values of the outgoing distances between the to-be-positioned node and the at least two reference nodes, X represents a coordinate of the to-be-positioned node used to calculate the outgoing distances, Y represents a coordinate of the to-be-positioned node used to calculate the incoming distances, $U_{out}$ represents a vector including coordinates, used to calculate the incoming distances, of the at least two reference nodes, and $V_{in}$ represents a vector including coordinates, used to calculate the outgoing distances, of the at least two reference nodes.

Optionally, in an embodiment, each element in the low-rank matrix is greater than or equal to 0. Specifically, to achieve an objective that each element in the low-rank matrix is greater than or equal to 0, in step 530, the to-be-positioned node may perform low-rank sparse factorization on the local distance matrix according to a constraint condition that each element in the low-rank matrix is greater than or equal to 0, to obtain the low-rank matrix.

An element in the low-rank matrix is used to record a network distance in the network coordinate system, the network distance represents a measurable physical quantity such as a network delay or network bandwidth, and these physical quantities are all non-negative. In this embodiment of the present disclosure, low-rank sparse factorization is performed on the local distance matrix according to the constraint condition that each element in the low-rank matrix is greater than or equal to 0. This ensures that each element in the low-rank matrix is a non-negative element. To be specific, this ensures that the network distance is non-negative, thereby improving accuracy of the determined coordinates of the to-be-positioned node, and further improving accuracy of subsequent network distance prediction.

It should be noted that, in this embodiment of the present disclosure, an optimal model used to perform low-rank sparse factorization on the local distance matrix is not specifically limited. For example, the following optimal model may be used to perform low-rank sparse factorization on the local distance matrix:

$$\min_{A,E}(\text{rank}(A), \|E\|_0)$$
$$\text{subject to } Q = A + E$$
$$A \geq 0,$$

where Q represents the local distance matrix, A represents the low-rank matrix, E represents the sparse matrix, rank(A) represents a rank of the matrix A, $\|E\|_0$ represents a zero norm of the matrix E, and A≥0 represents that each element in the matrix A is greater than or equal to 0.

For another example, the following optimal model may be used to perform low-rank sparse factorization on the local distance matrix:

$$\min_{A,E}(\text{rank}(A), \lambda\|E\|_0)$$
$$\text{subject to } Q = A + E$$
$$A \geq 0,$$

where Q represents the local distance matrix, A represents the low-rank matrix, E represents the sparse matrix, the matrix A≥0 indicates that each element in the matrix A is greater than or equal to 0, $\|A\|_*$ represents a nuclear norm of the matrix A, $\|E\|_1$ represents an L1 norm of the matrix E, $\lambda$ is a weight, and $\lambda$ is greater than 0.

Further, for ease of performing solving in a wider feasible range, a slack variable, that is, a matrix B, may be introduced and the constraint of the matrix A≥0 is changed to the following form:

$$\min_{A,E,B}(\|A\|_* + \lambda\|E\|_1)$$
$$\text{subject to } Q = A + E$$
$$A = B$$
$$B \geq 0.$$

It should be noted that, in this embodiment of the present disclosure, there may be a plurality of solving manners of the optimal model. For example, an ALM algorithm, an ADMM algorithm, or an iterative thresholding algorithm may be used.

Optionally, in an embodiment, the network coordinate system is the network coordinate system based on the matrix factorization model, a rank of the low-rank matrix is less than or equal to d, and d represents a dimension of coordinates in the network coordinate system. In the network coordinate system based on the matrix factorization model, a node includes two coordinates X and Y. X may be referred to as an outgoing vector, and Y may be referred to as an incoming vector. A dimension of the outgoing vector is the same as a dimension of the incoming vector, and d may represent the dimension of the outgoing vector or the dimension of the incoming vector.

Assuming that the network coordinate system includes M nodes and a dimension of an outgoing vector or an incoming vector of each node is d, a global distance matrix is $D=U_M V_M^T$, where $U_M$ is a matrix including outgoing vectors of the M nodes, and $V_M$ is a matrix including incoming vectors of the M nodes. The matrix $U_M$ is an M×d matrix, the matrix $V_M$ is a d×M matrix, and maximum rank values of the matrix $U_M$ and the matrix $V_M$ are d. Therefore, a maximum rank of D is d (it should be noted that d is usually far less than M). In this embodiment of the present disclosure, the local distance matrix is used to simulate the global distance matrix, and therefore a rank of the local distance matrix should be less than or equal to d. However, due to impact of an error value and an outlier value, the rank of the local distance matrix is usually quite high, and the error value and the outlier value need to be removed from the local distance matrix, to obtain the low-rank matrix. In this embodiment of the present disclosure, a constraint condition that the rank of the low-rank matrix is less than or equal to d is used, so that the solved low-rank matrix is in line with an actual situation better.

It should be noted that, if values of all elements in the local distance matrix are obtained in step 510, all elements in a target matrix may be 0; or if values of all elements in the local distance matrix are not obtained in step 510 (in this embodiment of the present disclosure, this case is referred to information loss of element), a default value, for example, 0, may be assigned to elements whose values are not obtained, to finish filling of the local distance matrix, so that low-rank sparse factorization can be performed subsequently. In this case, to resolve the foregoing information loss problem, the target matrix may be introduced in this embodiment of the present disclosure. The following describes the target matrix in detail.

Optionally, in an embodiment, because the values of the at least some elements (referred to as target elements below) in the local distance matrix are determined in step 510, the local distance matrix may be set to equal to a sum of the low-rank matrix, the sparse matrix, and the target matrix, and values of at least some elements in the target matrix are 0. Specifically, to achieve an objective that the local distance matrix is set to the sum of the low-rank matrix, the sparse matrix, and the target matrix and the values of the at least some elements in the target matrix are 0, in step 530, the to-be-positioned node may perform low-rank sparse factorization on the local distance matrix according to a constraint condition that the local distance matrix is equal to the sum of the low-rank matrix, the sparse matrix, and the target matrix and the values of the target elements in the target matrix are equal to 0.

The values of the target elements in the target matrix are 0. This is equivalent to an effect that the target matrix does not act on the target elements in a low-rank sparse factorization process. If a network distance between two nodes corresponding to an element in the local distance matrix is unknown, and a value of the element in the target matrix is not limited in this embodiment of the present disclosure, it indicates that the target matrix acts on only elements in the local distance matrix in which information is lost. In this way, even if the information loss problem exists, low-rank sparse factorization can still be performed on the local distance matrix, improving robustness of an algorithm.

Specifically, low-rank sparse factorization may be performed on the local distance matrix by using the following formula:

$$\min_{A,E,B,G} (\|A\|_* + \lambda \|E\|_1)$$

$$\text{subject to } Q = A + E + G$$
$$A = B$$
$$B \geq 0$$
$$\pi(G) = 0,$$

where Q represents the local distance matrix, A represents the low-rank matrix, E represents the sparse matrix, G represents the target matrix, $\pi(G)=0$ represents that the values of the target elements in the target matrix are equal to 0, a matrix $B \geq 0$ represents that each element in the matrix B is greater than or equal to 0, $\|A\|_*$ represents a nuclear norm of the matrix A, $\|E\|_1$ represents an L1 norm of the matrix E, $\lambda$ is a weight, and $\lambda$ is greater than 0.

In this embodiment of the present disclosure, an implementation of step 510, to be specific, a manner of constructing the local distance matrix, is not specifically limited and is described in detail below.

Optionally, in some embodiments, the local distance matrix further includes a second element set, elements in the second element set of the local distance matrix are used to record initial values of network distances between the at least two reference nodes, and step 510 may include: measuring, by the to-be-positioned node, the initial values of the network distances between the to-be-positioned node and the at least two reference nodes, to use the initial values as values of elements in the first element set of the local distance matrix; and determining, by the to-be-positioned node, based on the coordinates of the at least two reference nodes in the network coordinate system, the initial values of the network distances between the at least two reference nodes as values of the elements in the second element set of the local distance matrix.

In this embodiment of the present disclosure, the network distances between the reference nodes are determined by using the coordinates of the reference nodes in the network coordinate system, and the network distances are used as the initial values of the network distances between the reference nodes and recorded in the local distance matrix. A manner of determining the network distances based on the coordinates is easy to implement, a process of constructing the local distance matrix can be simplified, and computation efficiency can be improved.

The following describes more details about the embodiments of the present disclosure with reference to specific examples. It should be noted that examples in FIG. 6 to FIG. 9 are merely intended to help persons skilled in the art understand the embodiments of the present disclosure, instead of limiting the embodiments of the present disclosure to specific numerical values or specific scenarios shown in the examples. Persons skilled in the art may make various modifications or changes based on the examples provided in FIG. 6 to FIG. 9. Such modifications or changes shall also fall within the scope of the embodiments of the present disclosure.

Figure 6:
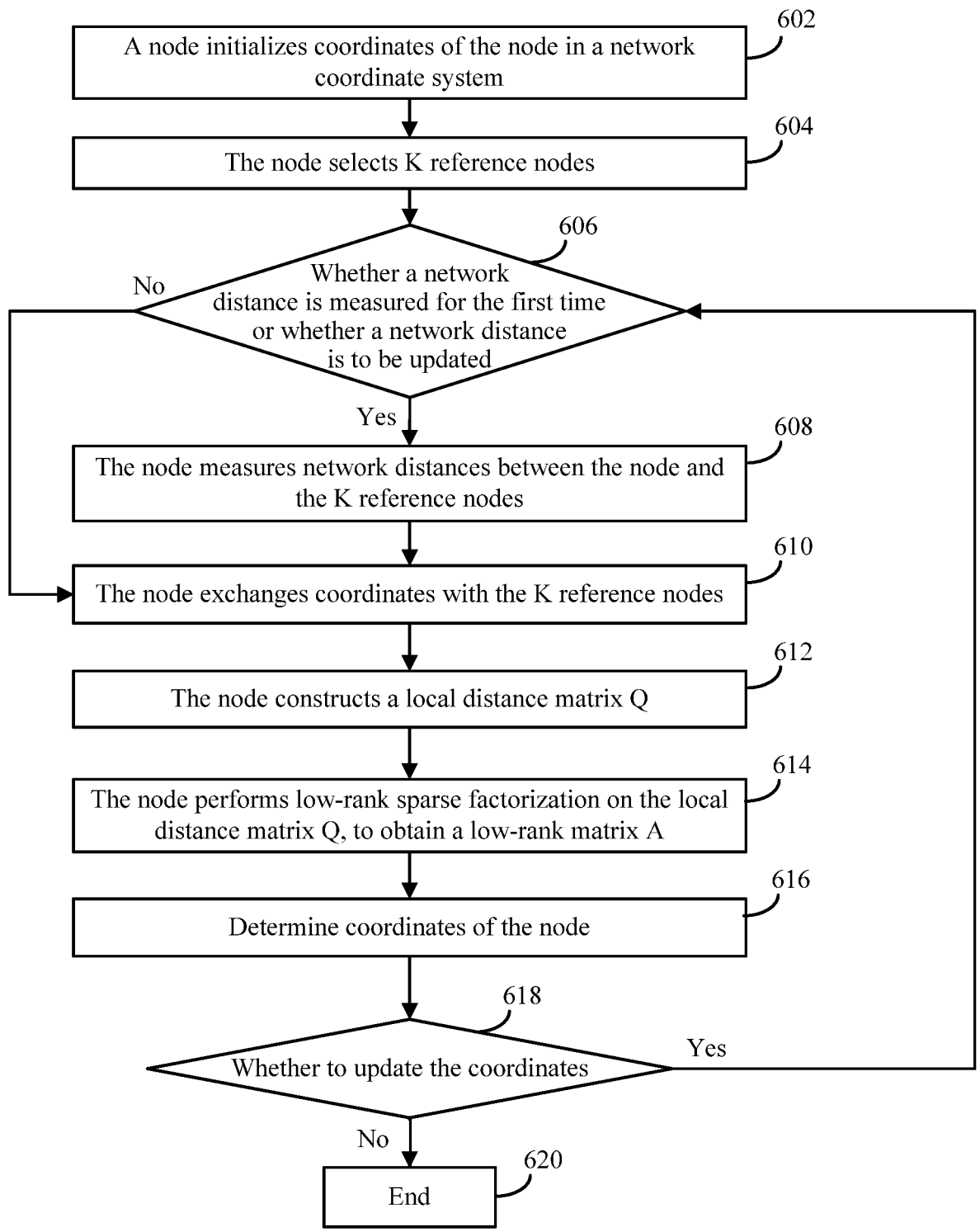
FIG. 6 is a schematic diagram of a procedure of determining coordinates of a node according to an embodiment of the present disclosure.

FIG. 6 is a schematic diagram of a procedure of determining coordinates of a node according to an embodiment of the present disclosure. It should be understood that processing steps or operations shown in FIG. 6 are merely examples, and other operations or variations of the operations in FIG. 6 may also be performed in this embodiment of the present disclosure. In addition, the steps in FIG. 6 may be performed in a sequence different from a sequence presented in FIG. 6, and not all the operations in FIG. 6 need to be performed. The method in FIG. 6 may be executed by any node in a network coordinate system. The node may correspond to the foregoing to-be-positioned node. In FIG. 6, descriptions are provided by using an example in which the network coordinate system is based on a matrix factorization model and coordinates of each node include X (an outgoing vector) and Y (an incoming vector). However, this is not limited in this embodiment of the present disclosure. The network coordinate system may alternatively be another network coordinate system such as a network coordinate system based on a Euclidean model. In addition, in the embodiment in FIG. 6, to reduce communication overheads of the system, it may be stipulated that each node may select only K reference nodes for communication and network distance measurement, where K may be an integer greater than 1.

The method shown in FIG. 6 includes the following steps.

602. A node initializes coordinates (referred to as local coordinates below) of the node in a network coordinate system.

For example, each node in the network coordinate system may randomly initialize local coordinates X and Y. Specifically, a dimension d of X or Y may be set first, then values of the coordinates X and Y are randomly generated, and the generated values of the coordinates are stored locally.

604. The node selects K reference nodes.

For example, the node may randomly select K reference nodes (K may be a preset reference, to be specific, it may be stipulated that each node may communicate with the K reference nodes, so as to reduce communication overheads), and locally store information about the reference nodes. The information about the reference nodes may include information required for accessing the reference nodes, such as Internet Protocol (IP) addresses of the reference nodes. Specifically, a node in the network coordinate system may be used as a server, to store routing information of nodes in the network coordinate system. The node may select reference nodes based on the routing information stored in the server, or may autonomously search for the reference nodes in another manner. Steps 602 and 604 may be referred to as an initialization phase.

606. The node determines whether a network distance is measured for the first time or whether a network distance needs to be updated.

If yes, step 608 is executed; or if no, step 610 is executed.

608. The node measures network distances between the node and the K reference nodes.

Specifically, the node measures distances $D_{out}$ (outgoing distances) and $D_{in}$ (incoming distances) between the node and the K reference nodes. A network distance between two nodes may represent a physical quantity such as a network delay or network bandwidth between the two nodes.

610. The node exchanges coordinates with the K reference nodes.

Specifically, the node may send coordinates X and Y of the node to the K reference nodes and receive coordinates of the K reference nodes, construct coordinate vectors $U_{out}$ and $V_{in}$ based on the coordinates of the K reference nodes, and locally store the coordinate vectors. $U_{out}$ is a vector including the coordinates X of the K reference nodes, and $V_{in}$ is a vector including the coordinates Y of the K reference nodes.

Steps 606 to 610 may be referred to as a data collection phase. Information such as $D_{out}$, $D_{in}$, $U_{out}$, and $V_{in}$ is obtained in steps 606 to 610. $D_{out}$ represents network distances (that is, outgoing distances) from the node to the K reference nodes, and $D_{in}$ represents network distances (that is, incoming distances) from the K reference nodes to the node. A network distance itself is an actual physical quantity such as a delay or bandwidth. $D_{out}$ corresponds to an outgoing vector X of the node multiplied by $V_{in}$, and $D_{in}$ corresponds to an incoming vector Y of the node multiplied by $U_{out}$.

Figure 7:
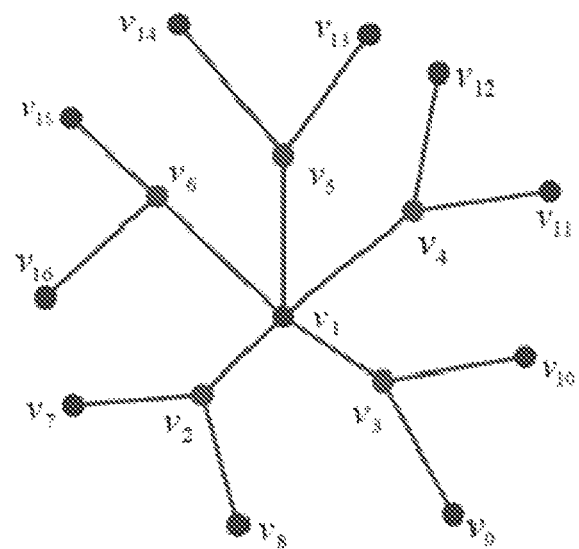
FIG. 7 is a schematic diagram of relationships between a to-be-positioned node and N hops of reference nodes according to an embodiment of the present disclosure.

It should be noted that, in some embodiments, the node may select not only one-hop reference nodes (that is, the foregoing K reference nodes) but also N-hop reference nodes (that is, reference nodes of reference nodes). A purpose of selecting the N-hop reference nodes by the node is to calculate network distances between more nodes, to increase a quantity of elements in a local distance matrix to be constructed subsequently, so that the local distance matrix is more approximate to a global distance matrix of the network coordinate system. However, information required for calculating network distances related to the N-hop reference nodes may be obtained from the one-hop reference nodes, so as to avoid breaking a rule that each node communicates with the K reference nodes. As shown in FIG. 7, one-hop reference nodes of a node v1 may be v2 to v6, reference nodes of v2 include v7 and v8, reference nodes of v3 include v9 and v10, and so on. The node v1 may select v7 to v16 as two-hop reference nodes. The node v1 obtains coordinates of the two-hop reference nodes from the one-hop reference nodes, and may determine network distances between the one-hop reference nodes and the two-hop reference nodes based on coordinates of the one-hop reference nodes and the coordinates of the two-hop reference nodes. It should be noted that a step of selecting the N-hop reference nodes is an optional step. Actually, each node can construct a local distance matrix based on the node and the K reference nodes.

612. The node constructs a local distance matrix Q.

The network coordinate system constructs the local distance matrix Q according to the following formula based on the coordinates X and Y of the node itself, the coordinate vectors $U_{out}$ and $V_{in}$ of the K reference nodes, and the distances $D_{out}$ and $D_{in}$ between the node and the K reference nodes that are obtained in the two previous phases:

$$Q = \begin{bmatrix} U_{out} V_{in}^T & D_{in}^T \\ D_{out} & c \end{bmatrix},$$

where $c = XY^T$, a network distance between any two nodes that is recorded in the local distance matrix may be used as an initial value of the network distance between the two nodes, a set that includes elements corresponding to $D_{out}$ and $D_{in}^T$ is the first element set described above, and information recorded by elements in the first element set is initial values of the network distances between the node and the K reference nodes that are obtained through measurement in step 608.

614. The node performs low-rank sparse factorization on the local distance matrix Q, to obtain a low-rank matrix A.

As described above, a rank of a global distance matrix of a network coordinate system based on a matrix factorization model does not exceed a dimension d of an incoming vector or an outgoing vector. In this embodiment of the present disclosure, the local distance matrix Q is a submatrix of a global distance matrix D and may be regarded as an approximation of the global distance matrix D, and a rank of the local distance matrix Q usually does not exceed d, either. However, due to impact of an error value and an outlier value, the rank of the local distance matrix Q usually far exceeds d. Therefore, low-rank spare factorization needs to be performed on the local distance matrix Q, to extract the low-rank matrix A from the local distance matrix Q and fit coordinates of the node based on values of the network distances between the node and the reference nodes in the low-rank matrix A, so that the fitted coordinates are more accurate.

First, an optimal model is established by using the local distance matrix Q as input and using the low-rank matrix A and a sparse matrix E as optimal variables (it should be understood that both the low-rank matrix A and the sparse matrix E are matrices whose sizes are the same as a size of the local distance matrix Q):

$$\min_{A,E}(\text{rank}(A), \lambda\|E\|_0)$$

$$\text{subject to } Q = A + E$$

$$A \geq 0.$$

For performing solving in a wider feasible range, a matrix B may be introduced as a slack variable. A target matrix, that is, a matrix G (for a function of the target matrix, refer to the foregoing descriptions, and details are not described herein again) may be introduced to solve a problem of an information loss problem, and the foregoing optimal model may be changed to the following multi-objective optimal model:

$$\min_{A,E,B,G}(\|A\|_* + \lambda\|E\|_1)$$

$$\text{subject to } Q = A + E + G$$

$$A = B$$

$$B \geq 0$$

$$\pi(G) = 0.$$

Finally, the multi-objective optimal model may be solved by using an ALM algorithm, to obtain the low-rank matrix A. In this embodiment of the present disclosure, a method for solving the foregoing optimal model based on the ALM algorithm may be referred to as a robust non-negative matrix completion (RNMC) method. For details about a process of solving the foregoing multi-objective optimal model, refer to FIG. 7.

616. Determine coordinates of the node.

The low-rank matrix A obtained in step 614 may be regarded as a local distance matrix from which an error value and an outlier value have been removed. A first element set of the low-rank matrix A records target values of the network distances between the node and the K reference nodes, including target values $A_{out}$ of outgoing distances between the node and the K reference nodes and target values $A_{in}$ of incoming distances between the node and the K reference nodes. It may be understood that, in this embodiment of the present disclosure, a product of $$\begin{bmatrix} U_{out} \\ X \end{bmatrix}$$

and $\lfloor V_{in}^T Y^T \rfloor$ is not equal to the local distance matrix Q, but a product of $$\begin{bmatrix} U_{out} \\ X \end{bmatrix}$$

and $\lfloor V_{in}^T Y^T \rfloor$ is equal to the low-rank matrix A, to be specific:

$$\begin{bmatrix} U_{out} \\ X \end{bmatrix} [V_{in}^T \ Y^T] = \begin{bmatrix} U_{out}V_{in}^T & U_{out}Y^T \\ XV_{in}^T & XY^T \end{bmatrix} = \begin{bmatrix} A_r & A_{in}^T \\ A_{out} & A_c \end{bmatrix} = A.$$

Then, the coordinates X and Y of the node may be calculated based on a non-negative constrained least square algorithm, and the coordinates X and Y obtained in step 602 are updated by using a calculation result.

Specifically, the coordinates of the node may be fitted based on the non-negative constrained least square algorithm by using the following formulas:

$$\min_X \|A_{out} - XV_{in}^T\|_F^2, \text{ s.t. } X \geq 0; \text{ and}$$

$$\min_X \|A_{in} - YU_{out}^T\|_F^2, \text{ s.t. } Y \geq 0.$$

618. Determine whether to update the coordinates.

If an obtained result meets a preset condition, the coordinates do not need to be updated. For example, if a quantity of coordinate updatings reaches a specified threshold or a difference between coordinates obtained through two consecutive updatings is less than a preset threshold, the coordinates do not need to be updated, and step 620 is performed. If the preset condition is not met, step 606 is performed, and the coordinates are updated.

Figure 8:
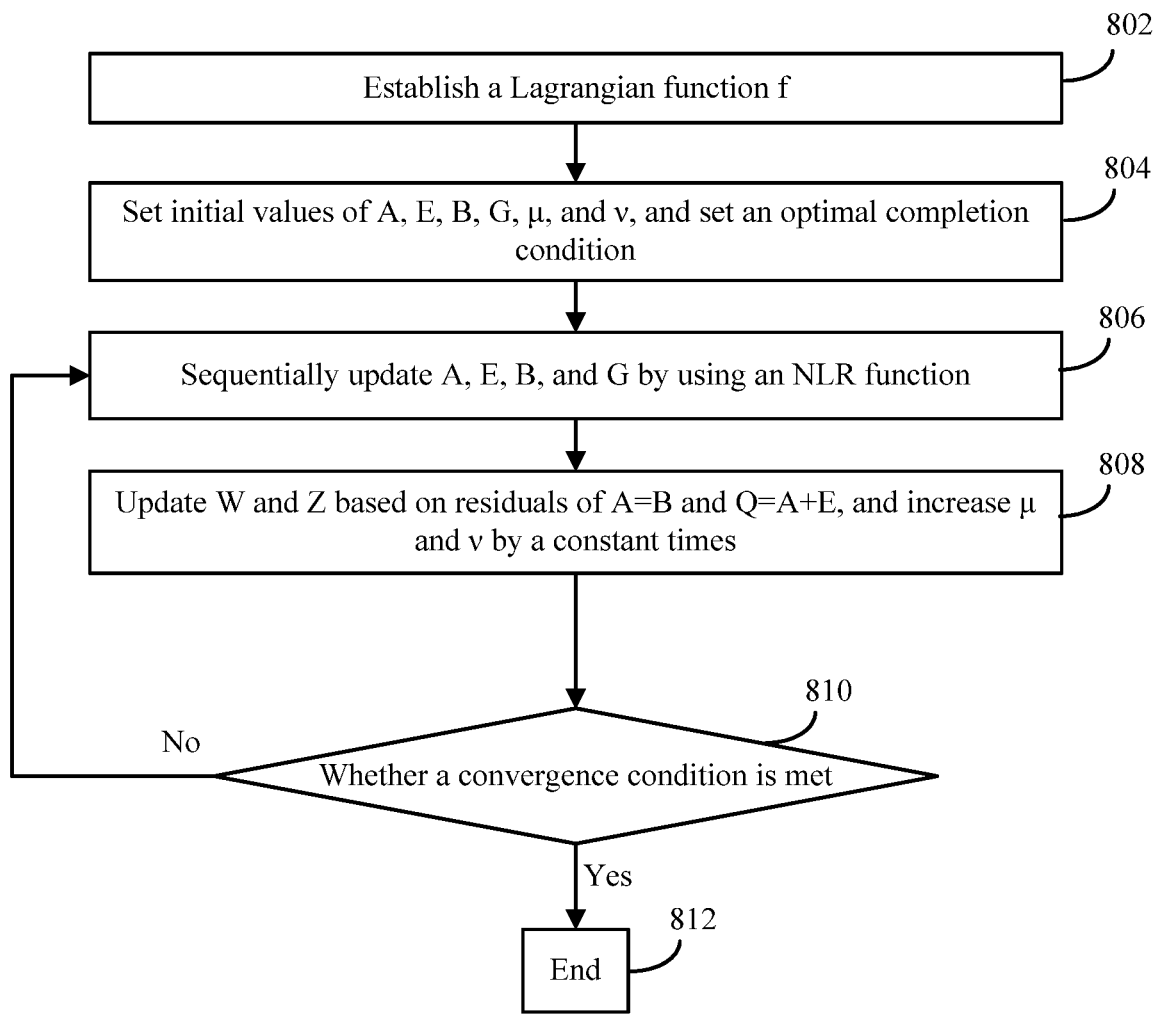
FIG. 8 is a flowchart of a low-rank sparse factorization algorithm.

FIG. 8 is a flowchart of a low-rank sparse factorization algorithm. A method shown in FIG. 8 includes the following steps.

802. Establish a Lagrange function f.

Specifically, two variables may be introduced: a matrix B and a matrix G (the matrix B is a slack variable, and the matrix G is a target matrix which is used to process an information loss problem). Correspondingly, two Lagrange multipliers W and Z may be introduced to establish the Lagrange function f:

$$f(A, E, B, G, W, Z, \mu, v) = \|A\|_* + \lambda\|E\|_1 + \langle W, Q - A - E - G\rangle + \frac{\mu}{2}\|Q - A - E - G\|_F^2 + \langle Z, A - B\rangle + \frac{v}{2}\|A - B\|_F^2,$$

where $\langle \cdot \rangle$ represents a Frobenius inner product of two matrices, p and v represent penalty parameters, both t and v are positive numbers, and $\|\cdot\|_F$ represents a Frobenius norm of a matrix.

804. Set initial values of A, E, B, G, µ, and v, and set an optimal completion condition.

Specifically, there may be a plurality of manners of setting the initial values of A, E, B, G, µ, and v. This is not specifically limited in this embodiment of the present disclosure. For example, initial values of elements in A, E, B, and G may be all set to 0, initial values of the Lagrange multipliers W and Z may also be set to 0, and initial values of the penalty parameters t and v may be set to any value greater than 0.

Then, the optimal completion condition is set as follows:

$$\min_{A,E,B,G} f(A, E, B, G, W, Z, \mu, v)$$

subject to $B \geq 0$, where B≥0 represents that each element in B is greater than or equal to 0.

806. Update A, E, B, and G.

Figure 9:
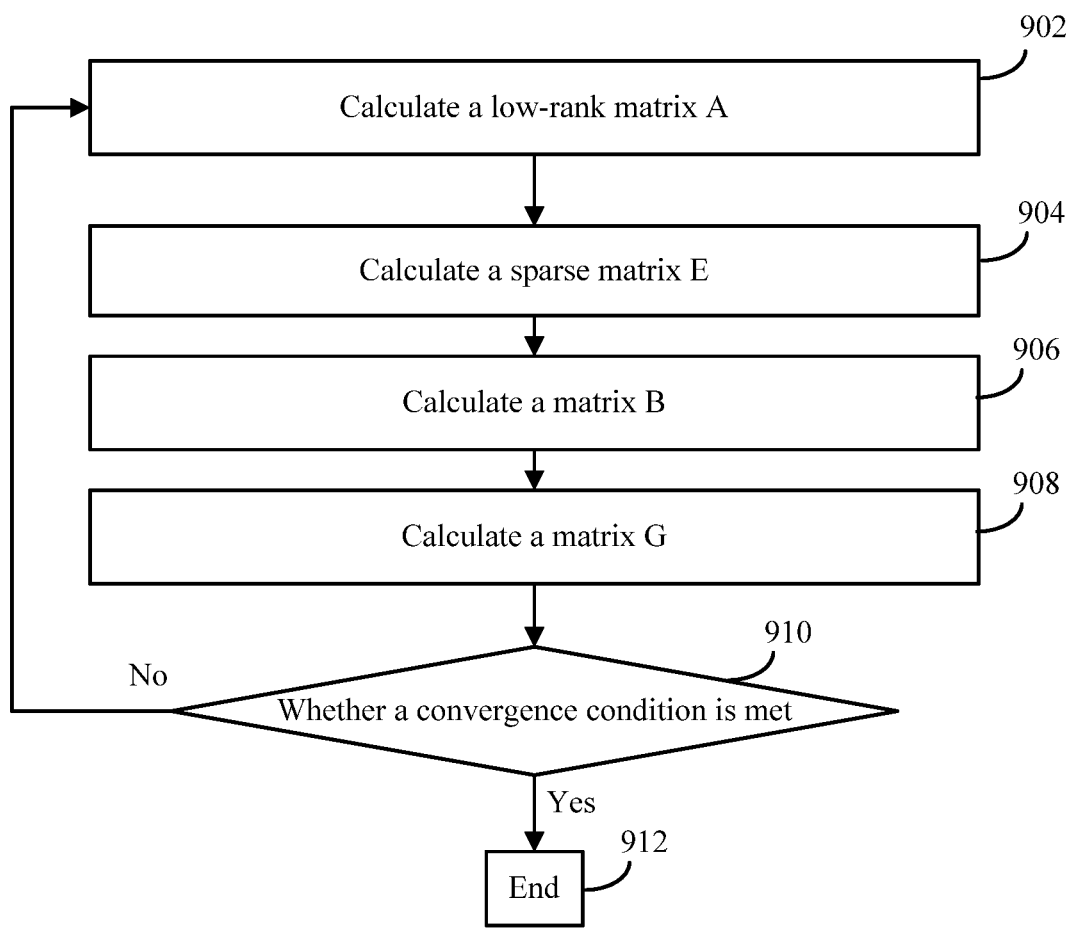
FIG. 9 is a detailed flowchart of step 806 in FIG. 8.

For details about an implementation of step 806, refer to FIG. 9.

808. Update W and Z based on residuals of A=B and Q=A+E, and increase t and v by constant times.

810. Determine whether a convergence condition is met.

If the optimal completion condition is met, step 812 is performed. If the optimal completion condition is not met, step 806 is performed, to proceed with optimization. It should be understood that the optimal completion condition may be that a difference between function values obtained through two consecutive iterations of the function f is less than a preset threshold, or a quantity of iterations reaches a preset threshold.

812. End.

FIG. 9 is a detailed flowchart of step 806 in FIG. 8.

902. Calculate a low-rank matrix A.

For example, the low-rank matrix A may be solved by using a low-rank soft thresholding method.

904. Calculate a sparse matrix E.

For example, the sparse matrix E may be solved by using a sparse soft thresholding method.

906. Calculate a matrix B.

Specifically, a value of B is a maximum value of an original value and zero.

908. Calculate a matrix G.

Specifically, G remains 0 at an Ω position and remains an opposite number of a residual outside Ω. Ω is a position corresponding to an element with a known network distance in a local distance matrix Q.

910. Determine whether a convergence condition is met.

If the convergence condition is met, step 912 is performed. If the convergence condition is not met, cycling is performed, starting from step 902. The convergence condition may be that a calculation result meets a Karush-Kuhn-Tucker (KKT) condition, or may be that a quantity of iterations reaches a preset threshold.

912. End.

The following describes apparatus embodiments of the present disclosure. Because the apparatus embodiments can execute the foregoing methods, for parts not described in detail, refer to the foregoing method embodiments.

Figure 10:
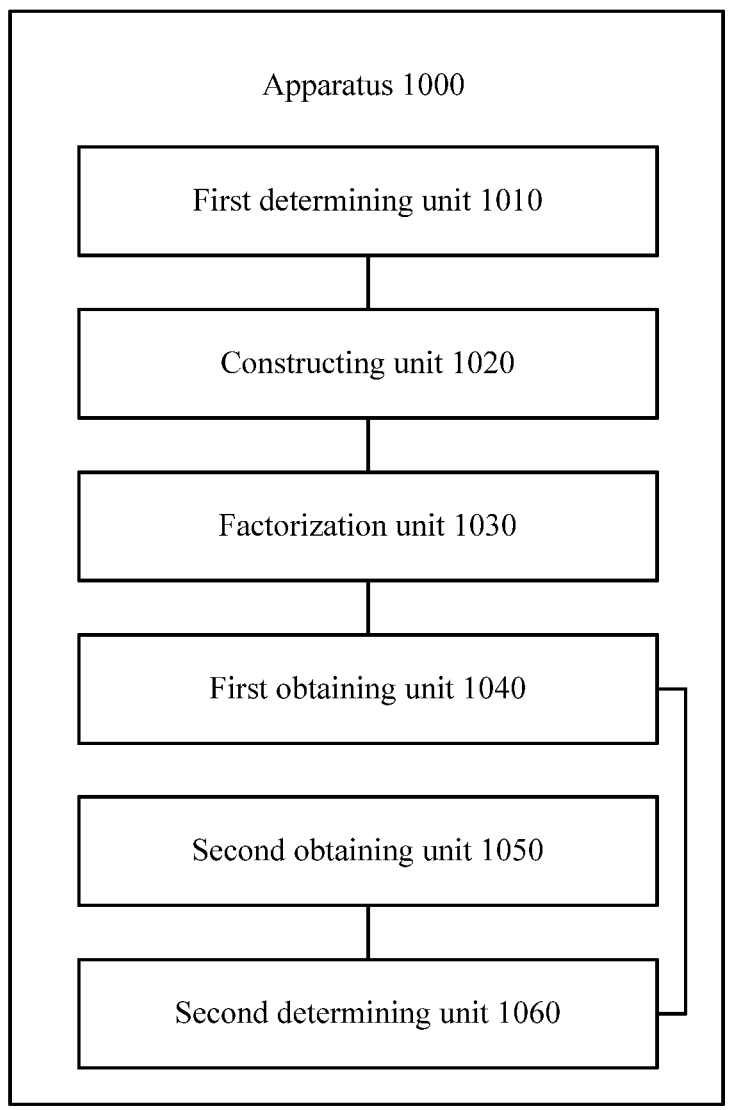
FIG. 10 is a schematic structural diagram of a network distance prediction apparatus according to an embodiment of the present disclosure.

FIG. 10 is a schematic structural diagram of a network distance prediction apparatus according to an embodiment of the present disclosure. The apparatus 1000 in FIG. 10 is a to-be-positioned node in a network coordinate system, and the apparatus 1000 includes: a first determining unit 1010 configured to communicate with at least two reference nodes, to determine values of at least some elements in a local distance matrix, where an element $Q_{ij}$ in the local distance matrix is used to record an initial value of a network distance between a node corresponding to row i and a node corresponding to column j of the local distance matrix, initial values of network distances between the to-be-positioned node and the at least two reference nodes are recorded in a first element set of the local distance matrix, and i and j are integers greater than or equal to 0; a constructing unit 1020 configured to construct the local distance matrix based on the values of the at least some elements in the local distance matrix; a factorization unit 1030 configured to perform low-rank sparse factorization on the local distance matrix, to obtain a low-rank matrix; a first obtaining unit 1040 configured to: obtain values of elements in a first element set of the low-rank matrix, to use the values as target values of the network distances between the to-be-positioned node and the at least two reference nodes; a second obtaining unit 1050 configured to communicate with the at least two reference nodes, to obtain coordinates of the at least two reference nodes in the network coordinate system; and a second determining unit 1060 configured to determine coordinates of the to-be-positioned node in the network coordinate system based on the target values of the network distances between the to-be-positioned node and the at least two reference nodes and the coordinates of the at least two reference nodes in the network coordinate system, where the coordinates of the to-be-positioned node in the network coordinate system are used to predict a network distance between the to-be-positioned node and a target node, and the target node is any node in the network coordinate system except the to-be-positioned node.

Optionally, in some embodiments, each element in the low-rank matrix is greater than or equal to 0.

Optionally, in some embodiments, the local distance matrix is equal to a sum of the low-rank matrix, a sparse matrix, and a target matrix, and values of the at least some elements in the target matrix are 0.

Optionally, in some embodiments, the factorization unit 1030 is further configured to perform low-rank sparse factorization on the local distance matrix based on the following optimal model, to obtain the low-rank matrix:

$$\min_{A,E,B,G}(\|A\|_* + \lambda\|E\|_1)$$
$$\text{s.t.}: Q = A + E + G$$
$$A = B$$
$$B \geq 0$$
$$\pi(G) = 0,$$

where Q represents the local distance matrix, A represents the low-rank matrix, E represents the sparse matrix, G represents the target matrix, $\pi(G)=0$ represents that the values of the at least some elements in the target matrix are 0, a matrix $B \geq 0$ represents that each element in the matrix B is greater than or equal to 0, $\|A\|_*$ represents a nuclear norm of the matrix A, $\|E\|_1$ represents an L1 norm of the matrix E, λ is a weight, and λ is greater than 0.

Optionally, in some embodiments, the local distance matrix further includes a second element set, elements in the second element set of the local distance matrix are used to record initial values of network distances between the at least two reference nodes. The first determining unit 1010 is further configured to: measure the initial values of the network distances between the to-be-positioned node and the at least two reference nodes, to use the initial values as values of elements in the first element set of the local distance matrix; and determine, based on the coordinates of the at least two reference nodes in the network coordinate system, the initial values of the network distances between the at least two reference nodes as values of the elements in the second element set of the local distance matrix.

Optionally, in some embodiments, the network coordinate system is a network coordinate system based on a matrix factorization model, a rank of the low-rank matrix is less than or equal to d, and d represents a dimension of coordinates in the network coordinate system.

Optionally, in some embodiments, the network coordinate system is the network coordinate system based on the matrix factorization model; the target values of the network distances between the to-be-positioned node and the at least two reference nodes include target values of incoming distances between the to-be-positioned node and the at least two reference nodes and target values of outgoing distances between the to-be-positioned node and the at least two reference nodes, the incoming distances are used to indicate network distances from the at least two reference nodes to the to-be-positioned node, and the outgoing distances are used to indicate network distances from the to-be-positioned node to the at least two reference nodes; and the second determining unit 1060 is further configured to determine the coordinates of the to-be-positioned node in the network coordinate system according to the following formulas:

$$\min_X \|A_{in} - YU_{out}^T\|_F^2, \text{ s.t. } Y \geq 0, \text{ and}$$
$$\min_X \|A_{out} - XV_{in}^T\|_F^2, \text{ s.t. } X \geq 0,$$

where $A_{in}$ represents the target values of the incoming distances between the to-be-positioned node and the at least two reference nodes, $A_{out}$ represents the target values of the outgoing distances between the to-be-positioned node and the at least two reference nodes, X represents a coordinate of the to-be-positioned node used to calculate the outgoing distances, Y represents a coordinate of the to-be-positioned node used to calculate the incoming distances, $U_{out}$ represents a vector including coordinates, used to calculate the incoming distances, of the at least two reference nodes, and $V_{in}$ represents a vector including coordinates, used to calculate the outgoing distances, of the at least two reference nodes.

Optionally, in some embodiments, the apparatus further includes: a sending unit configured to send request information to the target node in the network coordinate system, where the request information is used to request coordinates of the target node in the network coordinate system; and a predicting unit configured to predict the network distance between the to-be-positioned node and the target node based on the coordinates of the to-be-positioned node in the network coordinate system and the coordinates of the target node in the network coordinate system.

Optionally, in some embodiments, a network distance between two nodes in the network coordinate system is used to evaluate quality of a network between the two nodes.

Figure 11:
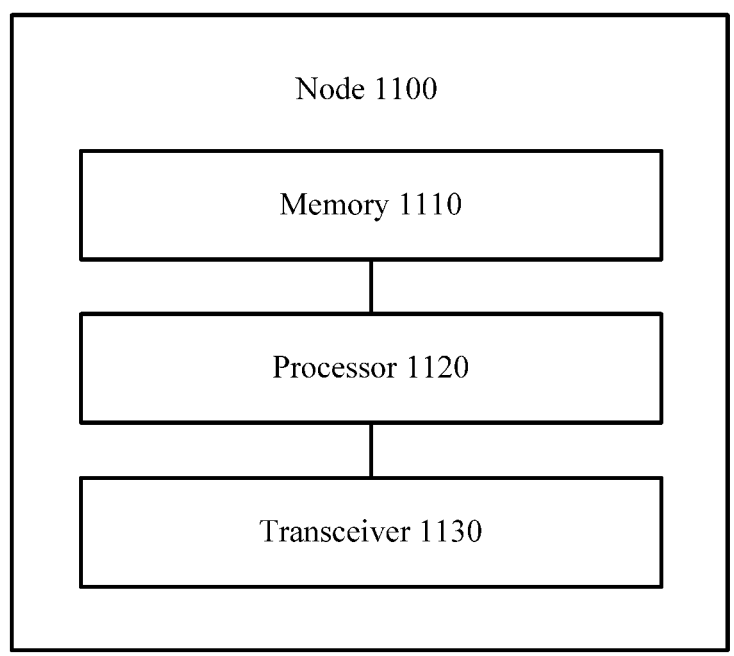
FIG. 11 is a schematic structural diagram of a node in a network coordinate system according to an embodiment of the present disclosure.

FIG. 11 is a schematic structural diagram of a network distance prediction node according to an embodiment of the present disclosure. The node 1100 in FIG. 11 is a to-be-positioned node in a network coordinate system. The node 1100 includes a memory 1110, a processor 1120, and a transceiver 1130 (for example, the transceiver 1130 may be a network interface card). The transceiver 1130 can implement communication-related functions of the first determining unit 1010 and the second obtaining unit 1050 in FIG. 10. The processor 1120 can implement remaining functions in FIG. 10 except the communication-related functions, such as functions of the constructing unit 1020, the factorization unit 1030, the first obtaining unit 1040, and the second determining unit 1060, and remaining functions of the first determining unit 1010 except the communication-related functions.

Specifically, the memory 1110 is configured to store a program. The processor 1120 is configured to execute the program stored in the memory 1110. When the program is executed, the processor 1220 communicates with at least two reference nodes by using the transceiver 1130, to determine values of at least some elements in a local distance matrix, where an element $Q_{ij}$ in the local distance matrix is used to record an initial value of a network distance between a node corresponding to row i and a node corresponding to column j of the local distance matrix, initial values of network distances between the to-be-positioned node and the at least two reference nodes are recorded in a first element set of the local distance matrix, and i and j are integers greater than or equal to 0; constructs the local distance matrix based on the values of the at least some elements in the local distance matrix; performs low-rank sparse factorization on the local distance matrix, to obtain a low-rank matrix; obtains values of elements in a first element set of the low-rank matrix, to use the values as target values of the network distances between the to-be-positioned node and the at least two reference nodes; communicates with the at least two reference nodes, to obtain coordinates of the at least two reference nodes in the network coordinate system; and determines coordinates of the to-be-positioned node in the network coordinate system based on the target values of the network distances between the to-be-positioned node and the at least two reference nodes and the coordinates of the at least two reference nodes in the network coordinate system, where the coordinates of the to-be-positioned node in the network coordinate system are used to predict a network distance between the to-be-positioned node and a target node, and the target node is any node in the network coordinate system except the to-be-positioned node.

Optionally, in some embodiments, each element in the low-rank matrix is greater than or equal to 0.

Optionally, in some embodiments, the local distance matrix is equal to a sum of the low-rank matrix, a sparse matrix, and a target matrix, and values of the at least some elements in the target matrix are 0.

Optionally, in some embodiments, the processor 1120 is further configured to perform low-rank sparse factorization on the local distance matrix based on the following optimal model, to obtain the low-rank matrix:

$$\min_{A,E,B,G}(\|A\|_* + \lambda\|E\|_1)$$
$$\text{s.t.}: Q = A + E + G$$
$$A = B$$
$$B \geq 0$$
$$\pi(G) = 0,$$

where Q represents the local distance matrix, A represents the low-rank matrix, E represents the sparse matrix, G represents the target matrix, $\pi(G)=0$ represents that the values of the at least some elements in the target matrix are 0, a matrix $B \geq 0$ represents that each element in the matrix B is greater than or equal to 0, $\|A\|_*$ represents a nuclear norm of the matrix A, $\|E\|_1$ represents an L1 norm of the matrix E, $\lambda$ is a weight, and $\lambda$ is greater than 0.

Optionally, in some embodiments, the local distance matrix further includes a second element set, elements in the second element set of the local distance matrix are used to record initial values of network distances between the at least two reference nodes. The processor 1120 is further configured to: measure the initial values of the network distances between the to-be-positioned node and the at least two reference nodes, to use the initial values as values of elements in the first element set of the local distance matrix; and determine, based on the coordinates of the at least two reference nodes in the network coordinate system, the initial values of the network distances between the at least two reference nodes as values of the elements in the second element set of the local distance matrix.

Optionally, in some embodiments, the network coordinate system is a network coordinate system based on a matrix factorization model, a rank of the low-rank matrix is less than or equal to d, and d represents a dimension of coordinates in the network coordinate system.

Optionally, in some embodiments, the network coordinate system is the network coordinate system based on the matrix factorization model; the target values of the network distances between the to-be-positioned node and the at least two reference nodes include target values of incoming distances between the to-be-positioned node and the at least two reference nodes and target values of outgoing distances between the to-be-positioned node and the at least two reference nodes, the incoming distances are used to indicate network distances from the at least two reference nodes to the to-be-positioned node, and the outgoing distances are used to indicate network distances from the to-be-positioned node to the at least two reference nodes; and the processor 1120 is further configured to determine the coordinates of the to-be-positioned node in the network coordinate system according to the following formulas:

$$\min_X \|A_{in} - YU_{out}^T\|_F^2, \text{ s.t. } Y \geq 0, \text{ and}$$

$$\min_X \|A_{out} - XV_{in}^T\|_F^2, \text{ s.t. } X \geq 0,$$

where $A_{in}$ represents the target values of the incoming distances between the to-be-positioned node and the at least two reference nodes, $A_{out}$ represents the target values of the outgoing distances between the to-be-positioned node and the at least two reference nodes, X represents a coordinate of the to-be-positioned node used to calculate the outgoing distances, Y represents a coordinate of the to-be-positioned node used to calculate the incoming distances, $U_{out}$ represents a vector including coordinates, used to calculate the incoming distances, of the at least two reference nodes, and $V_{in}$ represents a vector including coordinates, used to calculate the outgoing distances, of the at least two reference nodes.

Optionally, in some embodiments, the transceiver 1130 is further configured to send request information to the target node in the network coordinate system, where the request information is used to request coordinates of the target node in the network coordinate system; and the processor 1120 is further configured to predict the network distance between the to-be-positioned node and the target node based on the coordinates of the to-be-positioned node in the network coordinate system and the coordinates of the target node in the network coordinate system.

Optionally, in some embodiments, a network distance between two nodes in the network coordinate system is used to evaluate quality of a network between the two nodes.

Persons of ordinary skill in the art may be aware that units and algorithm steps in the examples described with reference to the embodiments disclosed in this specification may be implemented by electronic hardware or a combination of computer software and electronic hardware. Whether the functions are performed in a hardware manner or in a software manner depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the apparatus embodiments described above are merely examples. For example, the unit division is merely logical function division and may be other division during actual implementation. For example, a plurality of units or components may be combined or integrated into another system, or some features may be ignored or not be performed. In addition, the displayed or discussed mutual couplings or direct couplings or communication connections may be implemented by using some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes a medium that can store program code, such as a USB flash drive, a removable hard disk, a read-only memory (ROM), a random-access memory (RAM), a magnetic disk, or an optical disc.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A network distance prediction method implemented by a to-be-positioned node in a network coordinate system, the network distance prediction method comprising:
    communicating with reference nodes to determine first values of first elements in a local distance matrix, wherein first initial values of first network distances between the to-be-positioned node and the reference nodes are in a first element set of the local distance matrix;
    constructing the local distance matrix based on the first values, wherein at least some of the first values are 0;
    performing low-rank sparse factorization on the local distance matrix to obtain a low-rank matrix, wherein the local distance matrix is equal to a sum of the low-rank matrix, a sparse matrix, and a target matrix, and wherein second values of at least some second elements in the target matrix are 0;
    obtaining third values of third elements in a third element set of the low-rank matrix to use the third values as target values of the first network distances;
    communicating with the reference nodes to obtain first coordinates of the reference nodes; and
    determining second coordinates of the to-be-positioned node based on the target values and the first coordinates,
    wherein the second coordinates are for predicting a second network distance between the to-be-positioned node and a target node, and
    wherein the target node is any node in the network coordinate system except the to-be-positioned node.

2. The network distance prediction method of claim 1, wherein each third element is greater than or equal to 0.

3. The network distance prediction method of claim 1, further comprising further performing the low-rank sparse factorization based on the following optimal model:

$$\min_{A,E,B,G} (\|A\|_* + \lambda \|E\|_1)$$
$$\text{s.t.: } Q = A + E + G$$
$$A = B$$
$$B \geq 0$$
$$\pi(G) = 0,$$

wherein Q is the local distance matrix, A is the low-rank matrix, E is the sparse matrix, G is the target matrix, $\pi(G)=0$ represents that the second values are 0, $B \geq 0$ represents that a value of each element in a matrix B is greater than or equal to 0, $\|A\|_*$ is a nuclear norm of the matrix A, $\|E\|_1$ is an L1 norm of the matrix E, and $\lambda$ is a weight greater than 0.

4. The network distance prediction method of claim 1, wherein the local distance matrix further comprises a second element set, wherein the second element set comprises second elements for recording second initial values of second network distances between the reference nodes, and wherein the network distance prediction method further comprises:
   measuring the first initial values to use the first initial values as values of elements in the first element set; and
   determining, based on the first coordinates, the second initial values as values of the second elements.

5. The network distance prediction method of claim 1, wherein the network coordinate system is based on a matrix factorization model, wherein a rank of the low-rank matrix is less than or equal to d, and wherein d represents a dimension of coordinates in the network coordinate system.

6. The network distance prediction method of claim 5, wherein the target values comprise values of incoming distances between the to-be-positioned node and the reference nodes and values of outgoing distances between the to-be-positioned node and the reference nodes, and wherein the network distance prediction method further comprises further determining the second coordinates according to the following formulas:

$$\min_X \|A_{in} - YU_{out}^T\|_F^2, \text{ s.t. } Y \geq 0, \text{ and}$$
$$\min_X \|A_{out} - XV_{in}^T\|_F^2, \text{ s.t. } X \geq 0,$$

wherein $A_{in}$ is the values of the incoming distances, $A_{out}$ is the values of the outgoing distances, X is a coordinate of the to-be-positioned node for calculating the outgoing distances, Y is a coordinate of the to-be-positioned node for calculating the incoming distances, $U_{out}^T$ is a vector comprising coordinates for calculating the incoming distances, and $V_{in}^T$ is a vector comprising coordinates for calculating the outgoing distances.

7. The network distance prediction method of claim 1, further comprising:
   sending, to the target node, request information requesting third coordinates of the target node; and
   predicting the second network distance based on the second coordinates and the third coordinates.

8. The network distance prediction method of claim 1, further comprising evaluating a quality of a network between two nodes using a third network distance between the two nodes.

9. A network coordinates acquiring method implemented by a to-be-positioned node in a network coordinate system, the network coordinates acquiring method comprising:
   communicating with reference nodes to determine first values of first elements in a local distance matrix, wherein first initial values of first network distances between the to-be-positioned node and the reference nodes are in a first element set of the local distance matrix;
   constructing the local distance matrix based on the first values, wherein at least some of the first values are 0;
   performing low-rank sparse factorization on the local distance matrix to obtain a low-rank matrix, wherein the local distance matrix is equal to a sum of the low-rank matrix, a sparse matrix, and a target matrix, and wherein second values of at least some second elements in the target matrix are 0;
   obtaining third values of third elements in a third element set of the low-rank matrix to use the third values as target values of the first network distances;
   communicating with the reference nodes to obtain first coordinates of the reference nodes; and
   determining second coordinates of the to-be-positioned node based on the target values and the first coordinates,
   wherein a target node is any node in the network coordinate system except the to-be-positioned node.

10. A to-be-positioned node in a network coordinate system, the to-be-positioned node comprising:
    a memory; and
    a processor coupled to the memory and configured to:
       communicate with reference nodes to determine first values of first elements in a local distance matrix, wherein first initial values of first network distances between the to-be-positioned node and the reference nodes are in a first element set of the local distance matrix;
       construct the local distance matrix based on the first values, wherein at least one of the first elements is information loss;
       perform low-rank sparse factorization on the local distance matrix to obtain a low-rank matrix, wherein the local distance matrix is equal to a sum of the low-rank matrix, a sparse matrix, and a target matrix, and wherein second values of at least some second elements in the target matrix are 0;
       obtain third values of third elements in a third element set of the low-rank matrix to use the third values as target values of the first network distances;
       communicate with the reference nodes to obtain first coordinates of the reference nodes; and
       determine second coordinates of the to-be-positioned node based on the target values and the first coordinates,
       wherein the second coordinates are for predicting a second network distance between the to-be-positioned node and a target node, and
       wherein the target node is any node in the network coordinate system except the to-be-positioned node.

11. The to-be-positioned node of claim 10, wherein each third element is greater than or equal to 0.

12. The to-be-positioned node of claim 10, wherein the processor is further configured to further perform the low-rank sparse factorization based on the following optimal model:

$$\min_{A,E,B,G} (\|A\|_* + \lambda\|E\|_1)$$

$$\text{s.t.: } Q = A + E + G$$

$$A = B$$

$$B \geq 0$$

$$\pi(G) = 0,$$

wherein Q is the local distance matrix, A is the low-rank matrix, E is the sparse matrix, G is the target matrix, $\pi(G)=0$ represents that the second values are 0, $B \geq 0$ represents that a value of each element in a matrix B is greater than or equal to 0, $\|A\|_*$ is a nuclear norm of the matrix A, $\|E\|_1$ is an L1 norm of the matrix E, and $\lambda$ is a weight greater than 0.

13. The to-be-positioned node of claim 10, wherein the local distance matrix further comprises a second element set, wherein the second element set comprises second elements for recording second initial values of second network distances between the reference nodes, and wherein the processor is further configured to:
measure the first initial values to use the first initial values as values of elements in the first element set; and
determine, based on the first coordinates, the second initial values as values of the second elements.

14. The to-be-positioned node of claim 10, wherein the network coordinate system is based on a matrix factorization model, wherein a rank of the low-rank matrix is less than or equal to d, and wherein d represents a dimension of coordinates in the network coordinate system.

15. The to-be-positioned node of claim 10, wherein the target values comprise values of incoming distances between the to-be-positioned node and the reference nodes and values of outgoing distances between the to-be-positioned node and the at least two reference nodes, wherein the processor is further configured to further determine the second coordinates according to the following formulas:

$$\min_X \|A_{in} - YU_{out}^T\|_F^2, \text{ s.t. } Y \geq 0, \text{ and}$$

$$\min_X \|A_{out} - XV_{in}^T\|_F^2, \text{ s.t. } X \geq 0,$$

and wherein $A_{in}$ is the target values of the incoming distances, $A_{out}$ is the target values of the outgoing distances, X is a coordinate of the to-be-positioned node for calculating the outgoing distances, Y is a coordinate of the to-be-positioned node for calculating the incoming distances, $U_{out}^T$ is a vector comprising coordinates for calculating the incoming distances, and $V_{in}^T$ is a vector comprising coordinates for calculating the outgoing distances.

16. The to-be-positioned node of claim 10, wherein the processor is further configured to:
send, to the target node, request information requesting third coordinates of the target node; and
predict the second network distance based on the second coordinates and the third coordinates.

17. The to-be-positioned node of claim 10, wherein the processor is further configured to evaluate a quality of a network between two nodes using a network distance between the two nodes.

18. A to-be-positioned node in a network coordinate system, the to-be-positioned node comprising:
a memory; and
a processor coupled to the memory and configured to:
communicate with reference nodes to determine first values of first elements in a local distance matrix, wherein first initial values of first network distances between the to-be-positioned node and the reference nodes are in a first element set of the local distance matrix;
construct the local distance matrix based on the first values, wherein at least some of the first values are 0;
perform low-rank sparse factorization on the local distance matrix to obtain a low-rank matrix, wherein the local distance matrix is equal to a sum of the low-rank matrix, a sparse matrix, and a target matrix, and wherein second values of at least some second elements in the target matrix are 0;
obtain third values of third elements in a third element set of the low-rank matrix to use the third values as target values of the first network distances;
communicate with the reference nodes to obtain first coordinates of the reference nodes; and
determine second coordinates of the to-be-positioned node based on the target values and the first coordinates,
wherein a target node is any node in the network coordinate system except the to-be-positioned node.

19. A computer program product comprising computer-executable instructions stored on a non-transitory computer-readable medium that, when executed by a processor, cause to-be-positioned node in a network coordinate system to:
communicate with reference nodes to determine first values of first elements in a local distance matrix, wherein first initial values of first network distances between the to-be-positioned node and the reference nodes are in a first element set of the local distance matrix;
construct the local distance matrix based on the first values, wherein at least some of the first values are 0;
perform low-rank sparse factorization on the local distance matrix to obtain a low-rank matrix, wherein the local distance matrix is equal to a sum of the low-rank matrix, a sparse matrix, and a target matrix, and wherein second values of at least some second elements in the target matrix are 0;
obtain third values of third elements in a third element set of the low-rank matrix to use the third values as target values of the first network distances;
communicate with the reference nodes to obtain first coordinates of the reference nodes; and
determine second coordinates of the to-be-positioned node based on the target values and the first coordinates,
wherein a target node is any node in the network coordinate system except the to-be-positioned node.

20. The computer program product of claim 19, wherein each third element is greater than or equal to 0.

* * * * *

UNITED STATES PATENT AND TRADEMARK OFFICE
CERTIFICATE OF CORRECTION

Page 1 of 1

PATENT NO. : 10,749,754 B2
APPLICATION NO. : 16/371909
DATED : August 18, 2020
INVENTOR(S) : Jie Cheng et al.

It is certified that error appears in the above-identified patent and that said Letters Patent is hereby corrected as shown below:

In the Claims

Claim 15, Column 33, Line 34: "node and the at least two reference nodes, wherein" should read "node and reference nodes, wherein"

Claim 19, Column 34, Line 33: "to-be-positioned" should read "a to-be-positioned"

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*